US008483508B2

(12) United States Patent
Yen et al.

(10) Patent No.: US 8,483,508 B2
(45) Date of Patent: Jul. 9, 2013

(54) DIGITAL IMAGE TONE ADJUSTMENT

(75) Inventors: Jonathan Yen, San Jose, CA (US); William C. Kress, Mission Viejo, CA (US); Robert Poe, Encinitas, CA (US)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 323 days.

(21) Appl. No.: 12/941,876

(22) Filed: Nov. 8, 2010

(65) Prior Publication Data

US 2011/0051161 A1   Mar. 3, 2011

Related U.S. Application Data

(63) Continuation-in-part of application No. 12/194,025, filed on Aug. 19, 2008, now abandoned.

(60) Provisional application No. 61/258,641, filed on Nov. 6, 2009.

(51) Int. Cl.
  *G06K 9/40*   (2006.01)
  *H04N 1/60*   (2006.01)
(52) U.S. Cl.
  USPC ............................................ 382/274; 358/1.9

(58) Field of Classification Search
  USPC .. 382/274–275, 305, 312, 165, 169; 348/672, 348/673, 674, 687; 345/428, 611; 358/1.9, 358/3.26, 516, 519, 521, 522
  See application file for complete search history.

(56) References Cited

U.S. PATENT DOCUMENTS

| | | | |
|---|---|---|---|
| 5,422,680 A * | 6/1995 | Lagoni et al. | 348/674 |
| 5,515,113 A * | 5/1996 | Takeshima | 348/687 |
| 7,424,148 B2 * | 9/2008 | Goh | 382/169 |
| 8,125,569 B2 * | 2/2012 | Flores et al. | 348/672 |
| 8,131,108 B2 * | 3/2012 | Neuman | 382/274 |
| 2009/0245636 A1 | 10/2009 | Yen | |
| 2009/0274383 A1 | 11/2009 | Yen | |
| 2010/0046832 A1 | 2/2010 | Kress | |
| 2011/0026818 A1 | 2/2011 | Yen | |

* cited by examiner

*Primary Examiner* — Kanjibhai Patel
(74) *Attorney, Agent, or Firm* — SoCal IP Law Group LLP; Steven C. Sereboff; Jonathan Pearce

(57) ABSTRACT

Image tone adjustment systems and methods are disclosed. The system of the present invention includes an input to accept an input image. A curve generator is also disclosed that is used to generate a tone reproduction curve including a contrast stretch of the input image, a white stretch of the input image and a black stretch of the input image. Backlit correction is also applied by the tone adjustment corrector to thereby generate a tone adjusted image.

17 Claims, 28 Drawing Sheets

US 8,483,508 B2

DIGITAL IMAGE TONE ADJUSTMENT

RELATED APPLICATION INFORMATION

This patent claims priority from the following provisional patent applications: U.S. Provisional Patent Application No. 61/258,641 entitled "Digital Image Tone Adjustment" filed Nov. 6, 2009.

This patent is a continuation-in-part of co-pending U.S. patent application Ser. No. 12/194,025 filed Aug. 19, 2008 entitled "System and Method for Backlit Image Adjustment" which is incorporated herein in its entirety by reference.

This patent is related to co-pending U.S. patent application Ser. No. 12/940,934 filed Nov. 5, 2010 entitled "Image Contrast Enhancement" which is incorporated herein in its entirety by reference.

This patent is related to co-pending U.S. patent application Ser. No. 12/941,572 filed Nov. 8, 2010 entitled "System and Method for Contrast Enhancement of Digitally Encoded Images" which is incorporated herein in its entirety by reference.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

FIELD

This disclosure relates to digital image tone adjustment.

BACKGROUND

Digital image tone adjustment enables a user to improve the image quality of digital images. Digital or other images may have a number of issues that affect the image quality. For example, the image may be too dark. The image may be too bright. The image may be primarily one set of colors (such as primarily a dark image). Portions of images may also suffer from similar problems. A backlit face, for example, may appear very dark relative to its surroundings.

One of the benefits of digital images over physical images is that they may more easily be manipulated using computers. A user may adjust the color, brightness or contrast of pixels in an image, either directly or by application of one or more functions. These functions may detect problem regions in the image, may detect faces or may automatically detect overall problems with the image.

DETAILED DESCRIPTION

Image tone adjustment systems and methods are disclosed. The system of the present invention includes an input to accept an input image. A curve generator is also disclosed that is used to generate a tone reproduction curve including a contrast stretch of the input image, a white stretch of the input image and a black stretch of the input image. Backlit correction is also applied by the tone adjustment corrector to thereby generate a tone adjusted image.

Figure 1:
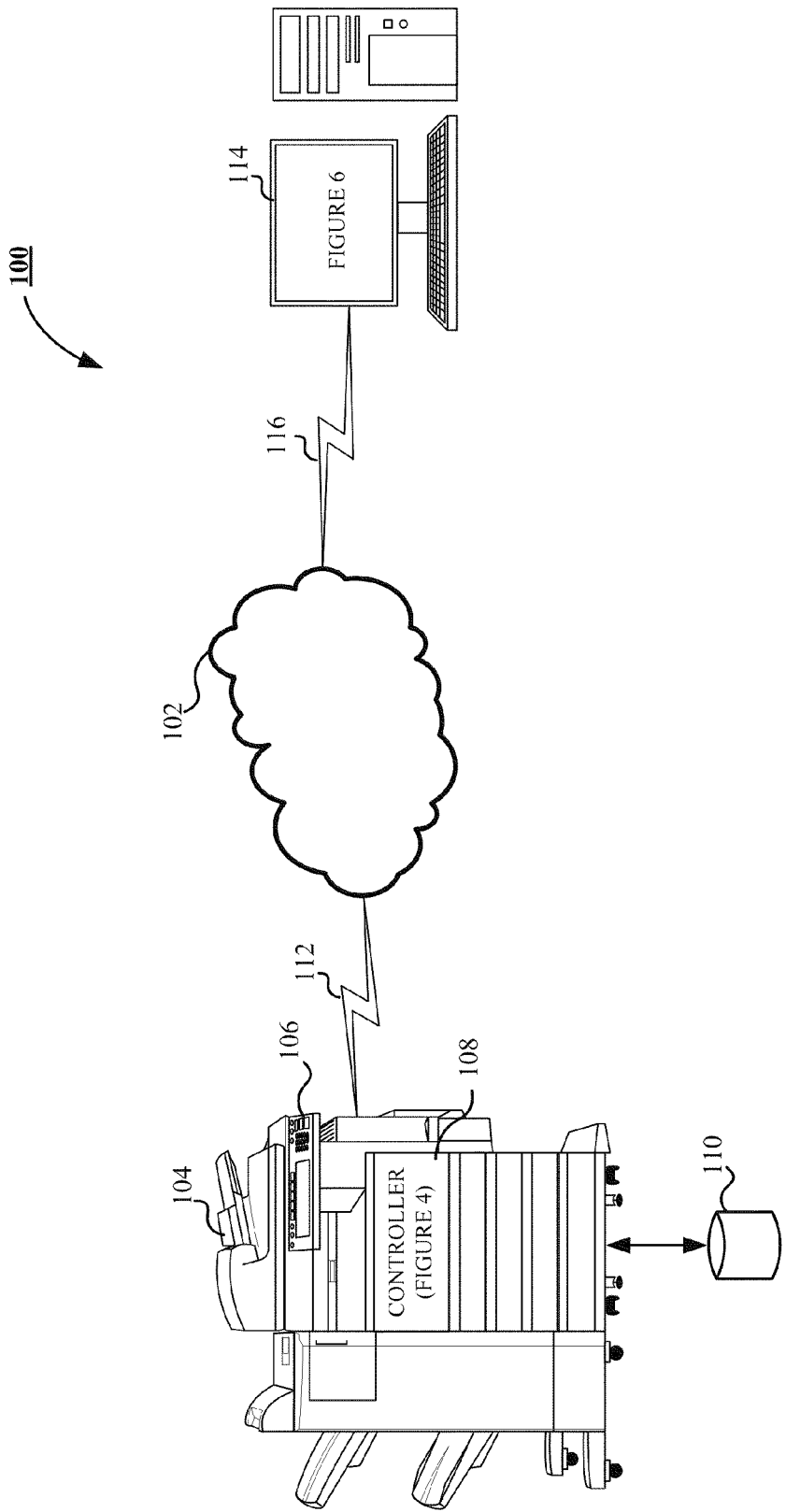
FIG. 1 is an overall diagram of a system or a method for image tone adjustment.

Referring now to FIG. 1, an overall diagram of an example system 100 for implementation of image tone adjustment is shown. The system 100 may be implemented in a distributed computing environment such as computer network 102. The computer network 102 enables the exchange of data between two or more electronic devices. The computer network 102 may be a virtual local area network, a wide area network, a personal area network, a local area network, the Internet, an intranet, or any combination of these. The computer network 102 may have physical layers and transport layers such as Token-Ring, 802.11(x), Ethernet, or other wireless or wire-based data communication mechanisms.

The system 100 also includes a document processing device 104, shown in FIG. 1 as a multifunction peripheral device, designed for a variety of document processing operations such as facsimile, scanning, copying, printing, electronic mail, document management and document storage. The Toshiba e-Studio Series Controller is one example of such a device. The document processing device 104 provides remote document processing services to external or network devices. The document processing device 104 may also include an audio reproduction component (not shown) such as a speaker, capable of emitting sounds.

The document processing device 104 is suitably equipped to receive a plurality of portable storage media including Firewire drives, USB drives, SD, MMC, XD, Compact Flash, and Memory Stick. The document processing device 104 includes an associated user interface 106, such as a touch-screen, LCD display, touch-panel, or alpha-numeric keypad through which an associated user is able to interact directly with the document processing device 104. The user interface 106 is used to communicate information to and receive selections from a user. The user interface 106 includes various components, used to present data to a user. The user interface 106 typically includes a display for displaying graphical elements, text data or images to a user. The user interface may also receive input from the associated user, and communicate the same to a backend component, such as controller 108. The document processing device 104 coupled to the computer network 102 via a communications link 112. Communications links include WiMax, 802.11a, 802.11b, 802.11g, 802.11(x), Bluetooth, the public switched telephone network, a proprietary communications network, infrared, optical, or any other wired or wireless data transmission communications. The document processing device 104 will be better understood in conjunction with the block diagrams illustrated in FIGS. 2 and 3, described below.

The document processing device 104 includes a controller 108 that enables many of the operations of the document processing device 104. The controller 108 may be embodied in hardware, software, or any combination of the two. The controller 108 is configured to control the operations of the associated document processing device 104, facilitate the display of images via the user interface 106, and direct the manipulation of electronic image data. The controller 108 is used to refer to any number of components associated with the document processing device 104. The functions described as performed by the controller 108 may be performed by any general purpose computing system. The controller 108 will better be understood in conjunction with FIGS. 4 and 5, described below.

The document processing device 104 is connected to a data storage device 110. The data storage device 110 may be any mass storage device such as magnetic storage drives, a hard disk drive, optical storage devices or flash memory devices. The data storage device 110 can store scanned image data, color measurement data and color calibration data. While FIG. 1 shows the data storage device 110 as a separate component of the system 100, the data storage device 110 may be implemented as an internal storage component of the document processing device 104 or a component of the controller 108 such as an internal hard disk drive. The data storage device 110 is capable of storing various types of data including document processing instructions, usage data, user interface data, job control data, controller status data, component execution data, images, advertisements, user information, location information, output templates, mapping data, multimedia data files and fonts.

A user device 114 is also shown in FIG. 1 as a computer workstation connected by means of a communications link 116 with the computer network 102. The user device 114 is shown as a computer workstation for illustration purposes only. As user device 114 may take any number of forms including a laptop computer, a workstation computer, a personal data assistant, a web-enabled cellular telephone, a smart phone, a proprietary network device, or other web-enabled electronic device. The communications link 116 may be any suitable channel of data communications such as a wired or wireless connection including Bluetooth, WiMax, 802.11a, 802.11b, 802.11g, 802.11(x), a proprietary communications network, infrared, optical, the public switched telephone network, or any wireless or wired communication. The user device 114 facilitates the image tone adjustment and communication with the document processing device 104. The user device 114 may also include an audio reproduction component (not shown) such as a speaker, or the like, capable of sounds. The user device 114 will better be understood in conjunction with the diagram shown in FIG. 6, described below.

Figure 2:
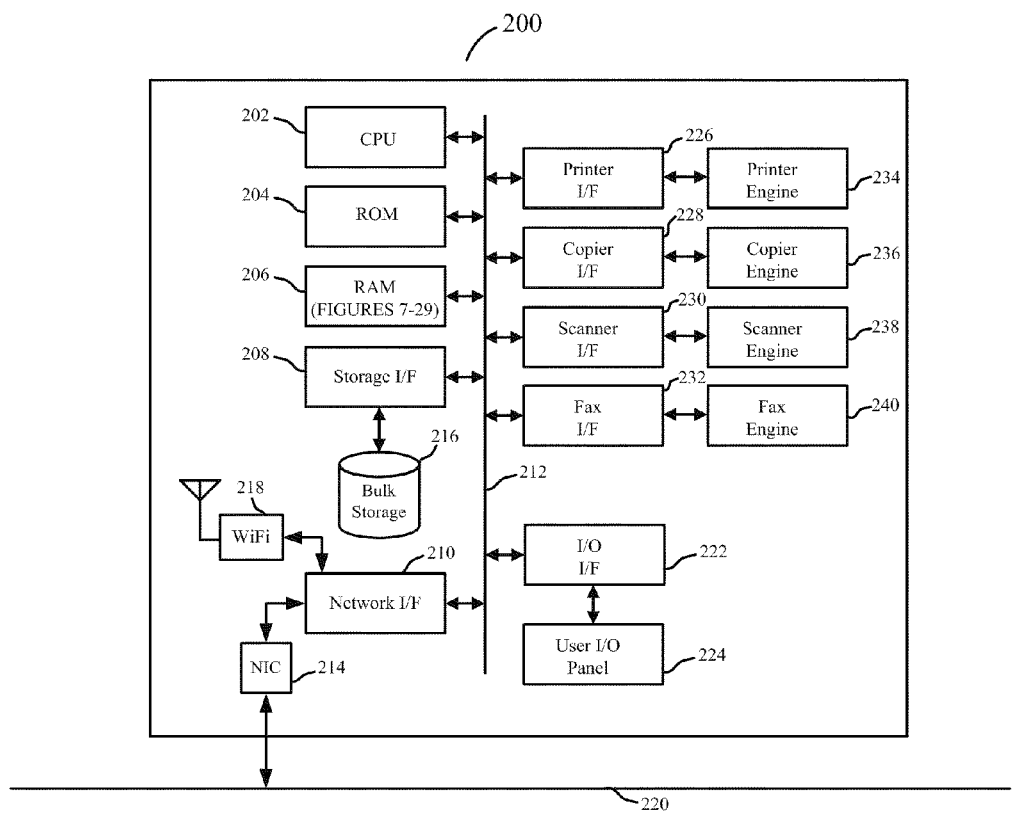
FIG. 2 is a block diagram of device hardware for use in image tone adjustment.

Turning now to FIG. 2, suitable example of a document processing device 104, shown in FIG. 1, is shown as device 200. The device 200 includes processor 202, such as a central processor unit or multiple processors working in concert with one another. The device 200 also includes non-volatile or read only memory 204 which is used for static or fixed data or instructions, such as BIOS functions, system functions, system configuration data, and other routines or data used for operation of the device 200.

Also included in the device 200 is random access memory 206 such as dynamic random access memory, static random access memory, or any other addressable memory system. Random access memory 206 provides a storage area for data instructions associated with applications and data handling by the processor 202. A storage interface 208 provides a mechanism for volatile, bulk or long term storage of data associated with the device 200. The storage interface 208 uses bulk storage, such as any suitable addressable or serial storage, such as a disk, or optical and tape drives as shown as 216.

A network interface subsystem 210 routes input and output from an associated network allowing the device 200 to communicate to other devices. The network interface subsystem 210 interfaces with one or more connections with external devices to the device 200. By way of example, one network interface card 214 for data communication with fixed or wired networks, such as Ethernet, Token-Ring, and the like, and a wireless interface 218, for wireless communication via means such as WiFi, WiMax, wireless modem, cellular network, or any suitable wireless communication system. In the illustration, the network interface card 214 is interconnected for data interchange via a physical network 220, typically a local area network, wide area network, or a combination of the two.

A bus 212 enables data communication between the processor 202, read only memory 204, random access memory 206, storage interface 208 and the network subsystem 210. Executable instructions on the device 200 facilitate communication with a plurality of external devices, such as workstations, document processing devices, other servers, or the like. While in operation a typical device operates autonomously. However, direct control by a local user is sometimes desirable. Such control is accomplished via an optional input/output interface 222 to a user input/output panel 224.

The bus 212 is also connected to one or more document processing engines. The printer interface 226, copier interface 228, scanner interface 230, and facsimile interface 232 are examples of document processing engines. These engines facilitate communication with printer engine 234, copier engine 236, scanner engine 238, and facsimile engine 240, respectively. The device 200 is designed to accomplish one or more document processing functions. Systems capable of more than one document processing operation are commonly referred to as multifunction peripherals or multifunction devices.

Figure 3:
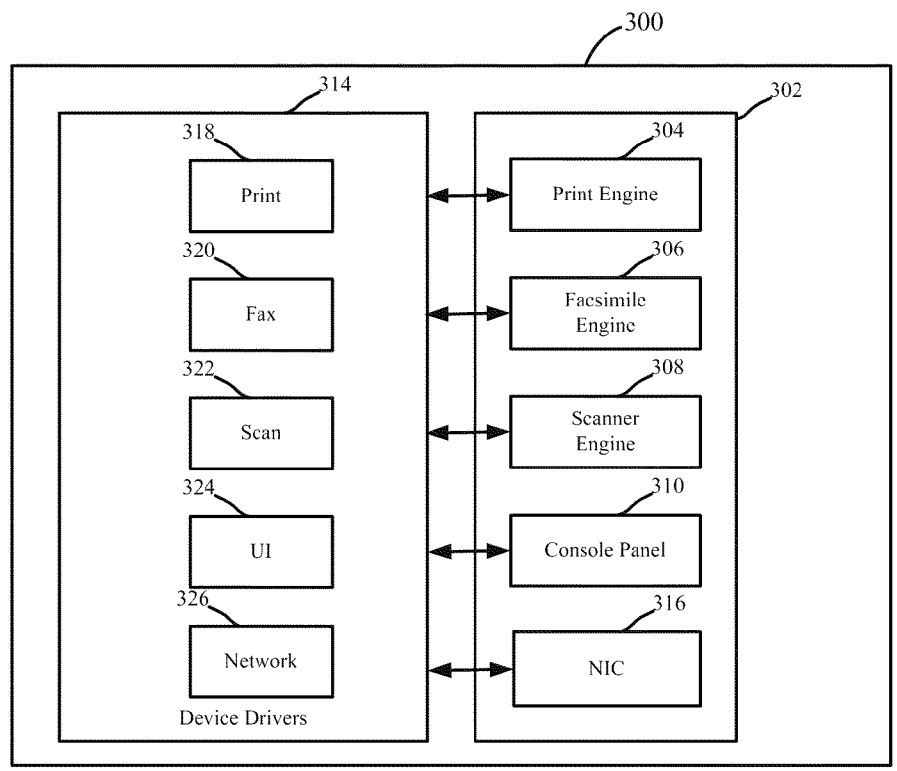
FIG. 3 is a functional diagram of a device for use in image tone adjustment.

Turning now to FIG. 3, the document processing device 300, previously depicted in FIG. 1 as the document processing device 104, is shown. FIG. 3 shows the functionality of the hardware of FIG. 2 in connection with software and operating system functionality. The document processing device 300 includes an engine 302 which facilitates one or more document processing operations.

The document processing engine 302 also includes a print engine 304, facsimile engine 306, scanner engine 308 and console panel 310. The print engine 304 allows for output of physical documents representative of an electronic document. The facsimile engine 306 communicates to or from external facsimile devices via a device, such as a fax modem. The scanner engine 308 receives hard copy documents and corresponding image data. A user interface, such as the console panel 310, allows a user to input instructions and displays information to a user. The scanner engine 308 is used to accept the input of tangible documents and to convert them into electronic form as bitmapped, vector or page description language format. The scanner engine 308 may also perform optical character recognition. Tangible document scanning also facilitates facsimile output.

As shown in FIG. 3, the document processing engine also includes an interface 316 with a network via driver 326, including a network interface card. The document processing engine 302 can interface with the network via various types of connections including wired, wireless or optical data communication.

The document processing engine 302 communicates with one or more device drivers 314. These device drivers 314 enable data interchange between the document processing engine 302 and one or more physical devices used to accomplish document processing operations. These document processing operations include printing via driver 318, facsimile communication via driver 320, scanning via driver 322 and a user interface functions via driver 324. These various devices may be integrated with one or more corresponding engines associated with the document processing engine 302. The document processing engine 302, using the various elements described, is capable of any set or subset of document processing operations. As such, these types of document processors are often described as multi-function peripherals.

Figure 4:
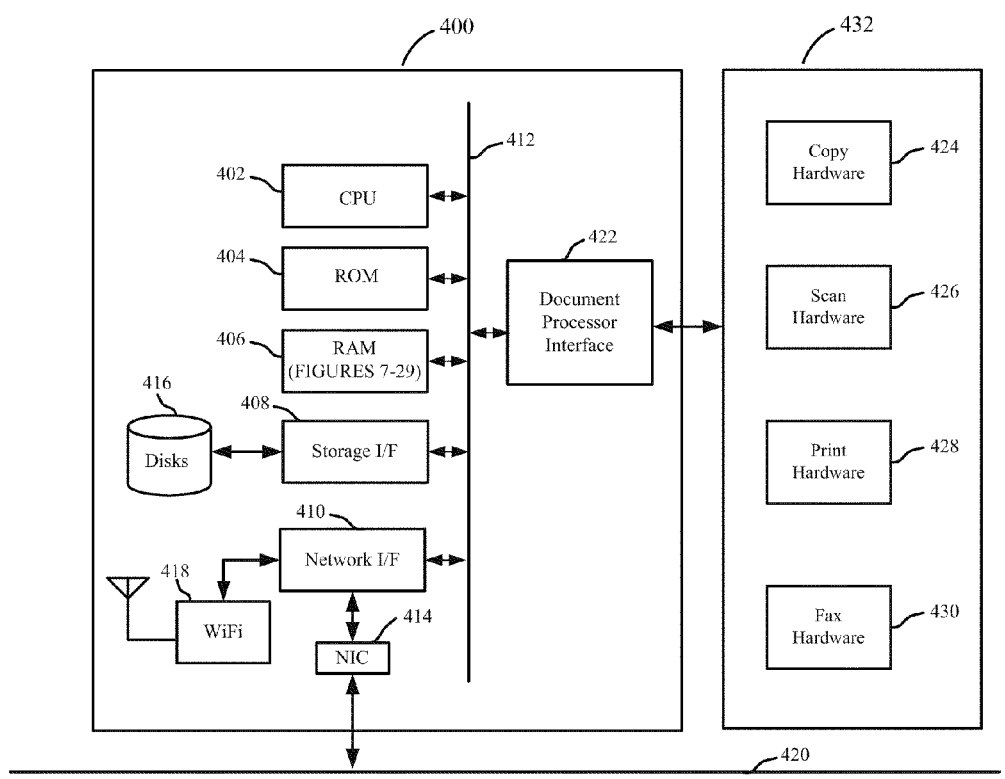
FIG. 4 is a block diagram of controller hardware for use in image tone adjustment.

Turning now to FIG. 4, a representative architecture of the controller 400, shown in FIG. 1 as the controller 108, is shown. The controller 400 may be any general computing device capable of the methodologies described herein. The controller 400 includes a processor 402, such as a central processor unit or multiple processors working in concert with one another. Non-volatile or read only memory 404 is used for static or fixed data or instructions, such as BIOS functions, system functions, system configuration data, and other routines or data used for operation of the controller 400.

The controller 400 also includes random access memory 406, such as dynamic random access memory, static random access memory or other addressable and writable memory systems. Random access memory provides a storage area for data instructions associated with applications and data handling accomplished by processor 402. A storage interface 408 provides a mechanism for non-volatile, bulk or long term storage of data associated with the controller 400. The storage interface 408 uses disks 416 which may be disk-based, optical or tape drives for bulk storage.

A network interface subsystem 410 routes input and output from an associated network allowing the controller 400 to communicate with other devices. The network interface subsystem 410 interfaces with external devices using one or more connections. One network interface card 414 is shown, though more may be employed. The network interface card 414 may be used for data communication with fixed or wired networks, such as Ethernet, Token-Ring, and a wireless interface 418, for wireless communication via means such as WiFi, WiMax, wireless modem, cellular network or other wireless communication system. The network interface subsystem may use any type of physical or non-physical data transfer layer or protocol layer. The network interface 414 is connected to a physical network 420, such as a local area network, wide area network or a combination of both.

A bus 412 is used for data communication between the processor 402, read only memory 404, random access memory 406, storage interface 408 and the network interface subsystem 410. The document processor interface 422 also uses the bus 412 for data communication. The document processor interface 422 communicates with hardware 432 in order to perform one or more document processing operations. The types of operations that may be performed include copying using the copy hardware 424, scanning using the scan hardware 426, printing using the print hardware 428, and facsimile communication using the facsimile hardware 430. The controller 400 controls each of the document processing operations.

The functionality described herein is implemented on a document processing device 104 including the controller 400 of FIG. 4, (shown in FIG. 1 as the controller 108) as an intelligent subsystem associated with a document processing device.

Figure 5:
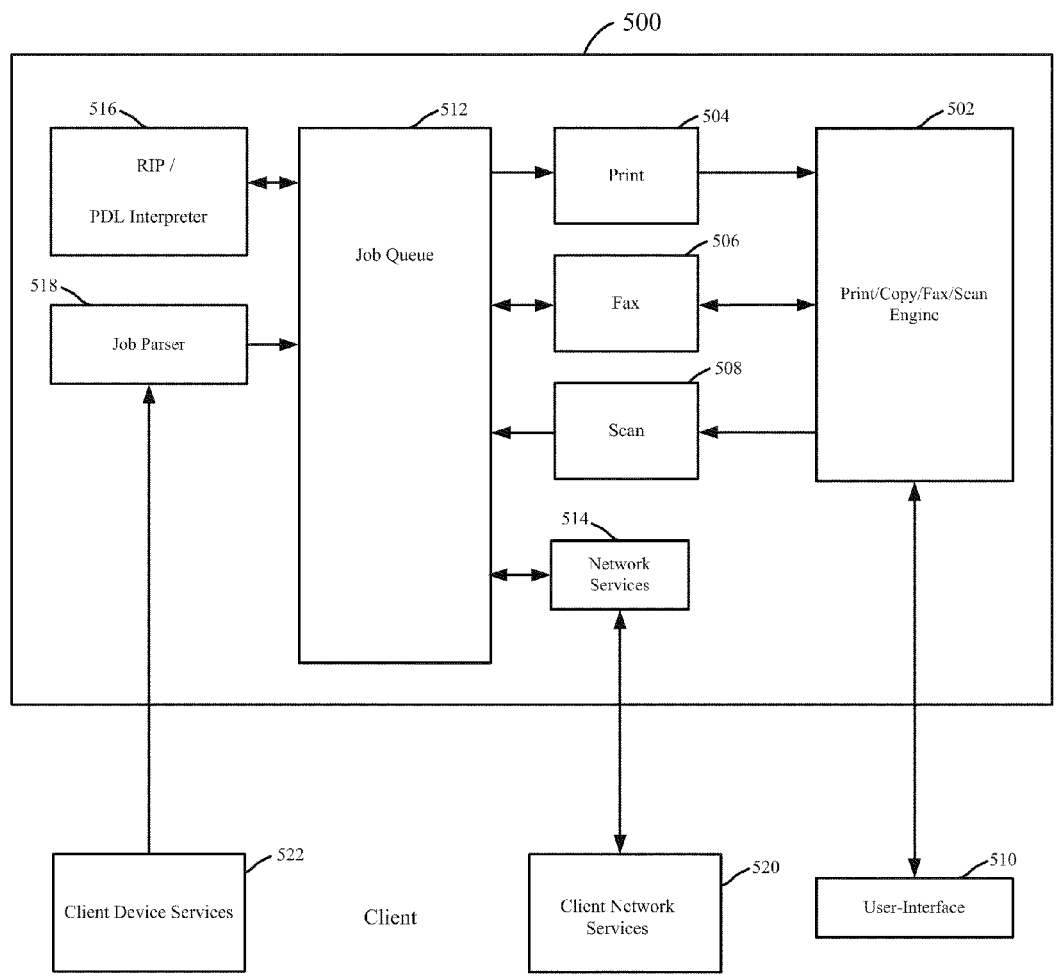
FIG. 5 is a functional diagram of a controller for use in image tone adjustment.

FIG. 5 shows the functionality of the hardware of FIG. 4 in connection with software and operating system functionality. FIG. 5 shows the controller function 500. The controller function 500 includes a document processing engine 502. The engine 502 enables printing operations, copy operations, facsimile operations and scanning operations. These types of operations are typical of multi-function devices. However, the subject controller need not have all of the capabilities described. Controllers may implement one or more of the document processing operations described above.

The engine 502 includes a user interface panel 510 for accessing the various functions of the engine 502. Access may be local or remotely via a remote thin or thick client. The engine 502 may also communicate with the print function 504, facsimile function 506, and scan function 508. These functions enable printing, facsimile transmission and reception, and document scanning for use in securing document images for copying or generating electronic versions.

A job queue 512 stores a series of jobs for execution by the print function 504, facsimile function 506, and scan function 508. Various image forms, such as bitmap, page description language or vector format may be relayed to the job queue 512 from the scan function 508 for handling.

The job queue 512 may also communicate using network services 514. Information such as, job control, status data, or electronic document data may be exchanged between the job queue 512 and the network services 514. Network-based access to the controller function 500 using client network services 520 may also be provided. The network-based access may be accomplished using a hypertext transfer protocol, file transfer protocol, uniform data diagram protocol, or any other network exchange mechanism. The network services 514 also enable data interchange with client network services 520 for communication via FTP, electronic mail or TELNET. The controller function 500 enables output and receipt of electronic documents and user information using the network services 514.

The job queue 512 may also communicate with an image processor 516. The image processor 516 may be a raster image processor, page description language interpreter or any suitable mechanism for conversion of an electronic document into a format for use in device functions like print 504, facsimile 506 or scan 508 functions.

The job queue 512 may also communicate with a parser 518 for use in receiving print job language files from an external device, such as client device services 522. The client device services 522 may include printing, facsimile transmission, or other input of an electronic document for handling by the controller function 500. The parser 518 interprets a received electronic document and relays it to the job queue 512 for handling.

Figure 6:
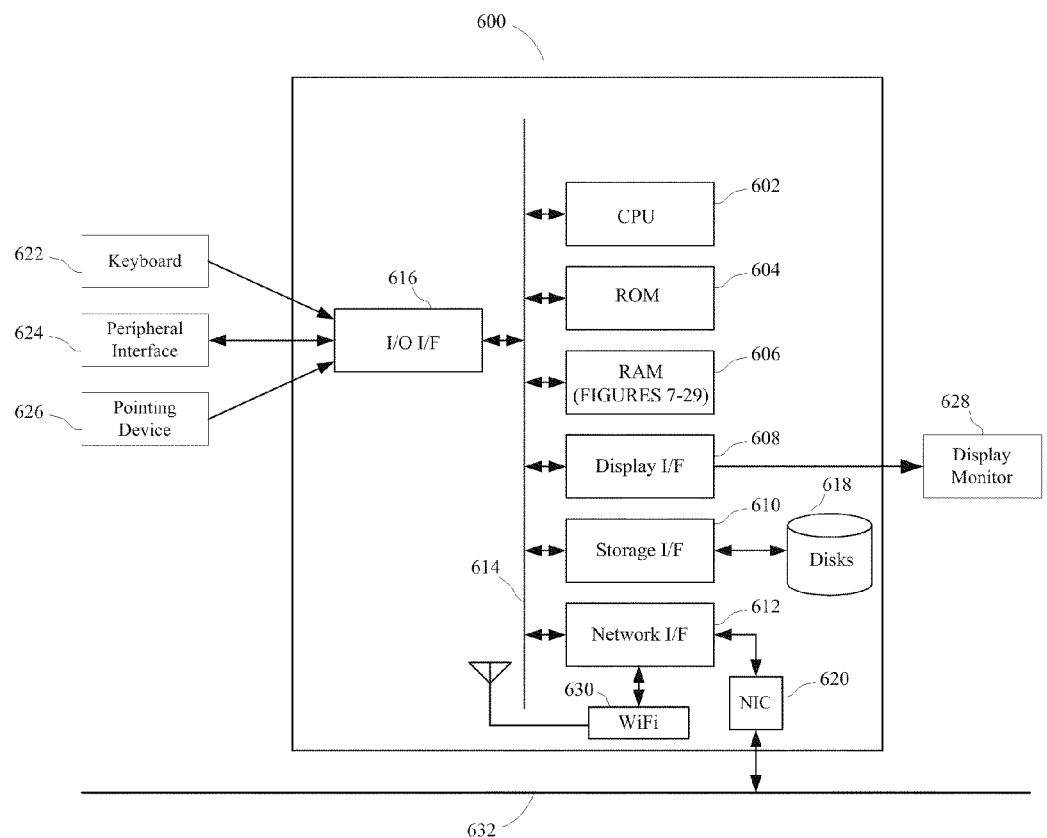
FIG. 6 is a diagram of a workstation for use in image tone adjustment.

Turning now to FIG. 6, a hardware diagram of a workstation 600 is shown. This workstation was previously identified as user device 114 in FIG. 1. The workstation 600 includes a processor 602 which may communicate with read only memory 604, non-volatile read only memory, volatile read only memory or a combination of both, random access memory 606, display interface 608, storage interface 610, and network interface 612. The bus 614 communicates and interfaces with the various modules. The read only memory 604 may include firmware, such as static data or fixed instructions, BIOS, system functions, configuration data, and other routines used during the operation of the workstation 600 and CPU 602. The random access memory 606 also provides a storage area for data and instructions associated with applications and data handling by the processor 602.

The display interface 608 receives data or instructions from other components on the bus 614 which is used to display a user interface. The display interface 608 provides output to a display terminal 628, such as a monitor, LCD or plasma display device.

The storage interface 610 provides non-volatile, bulk or long term storage of data or instructions in the workstation 600. The storage interface 610 may use storage 618 which may take the form of a disk, tape, CD, DVD, or other reasonably high capacity addressable or serial storage medium.

The network interface 612 communicates to at least one other network interface, shown as network interface 620, such as a network interface card, and wireless network interface 630, such as a WiFi wireless network card. A network interface 612 may communicate using both physical and protocol layers. It may also use any wired or wireless system, such as Ethernet, Token-Ring, any other wide area or local area network communication system, WiFi or WiMax. The network interface 620 is interconnected for data interchange using a physical network 632, such as a local area network, wide area network, or a combination of both.

An input/output interface 616 uses the bus 614 connected to an input device 622, such as a keyboard or a mouse. The input/output interface 616 also provides data output to a peripheral interface 624, such as a USB, universal serial bus output, SCSI or Firewire (IEEE 1394) output. The input/output interface 616 may also communicate with a pointing device interface 626 used to connect to devices, such as a mouse, light pen or touch screen.

Figure 7:
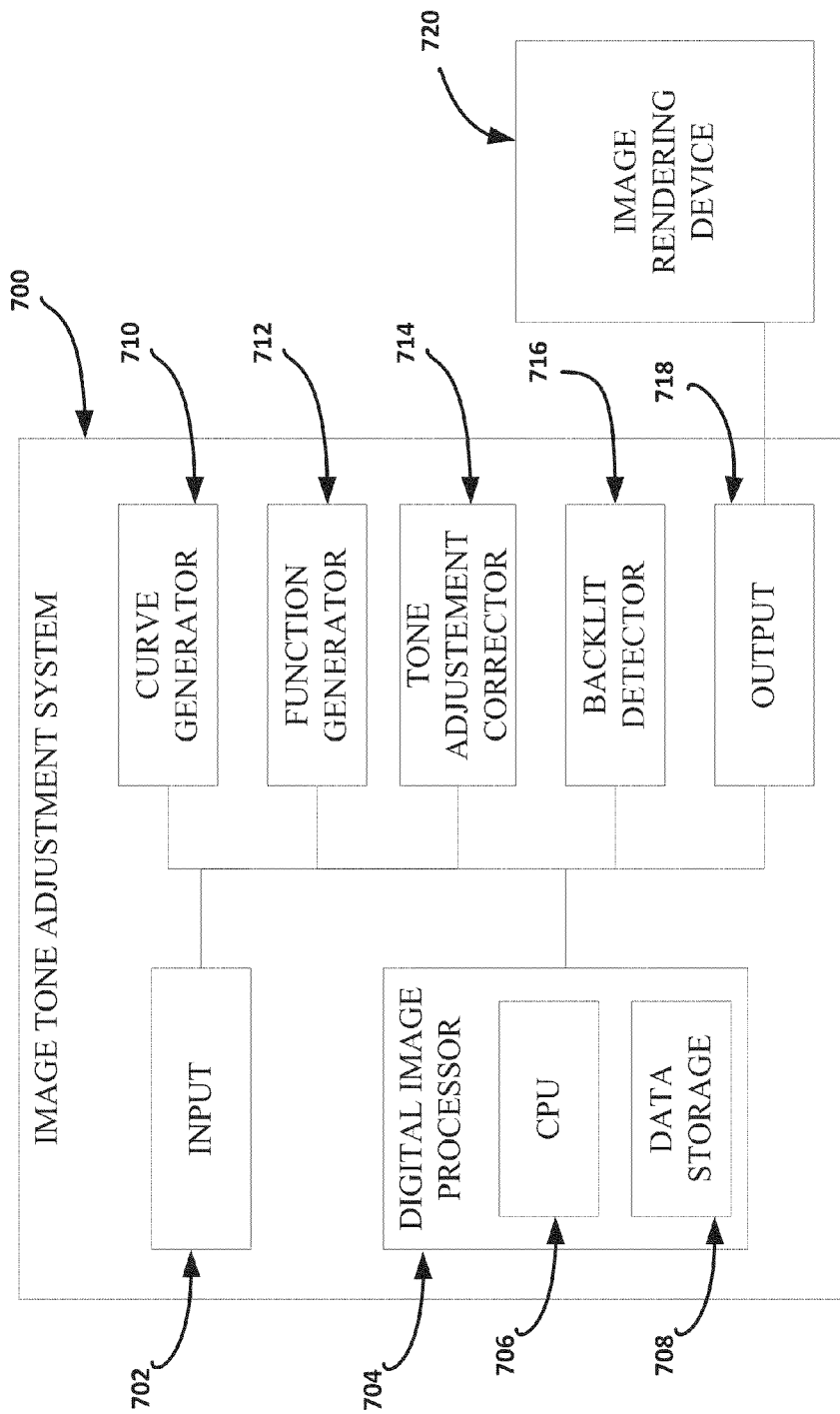
FIG. 7 is a block diagram of a system for image tone adjustment.

FIG. 7 is a block diagram of an image tone adjustment system 700. The image tone adjustment system may be implemented in the controller 108 or user device 114, as described with reference to FIGS. 1-6 above. The tone adjustment system 700 includes an input 702 for receipt of image data into a digital image processor 704. The digital image processor 704 may include at least one CPU 706 and associated data storage 708. The image data includes digital pixel values, each including a brightness value.

The system 700 further employs a curve generator 710 that generates a tone reproduction curve (TRC) function. The tone reproduction curve includes six parameters. These are the black stretch (BS), the white stretch (WS), the curvature factor of the sagging part of the s-curve, the curvature factor of the bulging part of the s-curve, and the x and y coordinates of the inflection point of the curve. Collectively, these make up the tone reproduction curve. When the x and y coordinates are equal, the united function degenerates to black stretch plus white stretch plus contrast stretch of the s-curve (CS) or BS+WS+CS.

The tone adjustment system 700 also includes a function generator 712, a tone adjustment corrector 714, a backlit detector 716 and an output 718. The function generator 712 is used to generate the function necessary to describe the curve generated by the curve generator 710. The tone adjustment corrector 714 applies the tone reproduction curve to the image data so as to generate contrast enhanced image data. The backlit detector 716 detects images that contain backlighting and that are suitable for backlit correction. The output 718 may output the contrast enhanced image data to an associated image rendering device 720.

Each of these elements is shown as independent hardware in the tone adjustment system 700. However, each of the function generator 712, tone adjustment corrector 714, and the backlit detector 716 may be implemented in software within the digital image processor 720.

The system 100 and components described above with respect to FIGS. 1-7, will be better understood in conjunction with the methodologies described hereinafter with respect to FIG. 8 as well as the example illustrations of FIGS. 9-28.

Figure 8:
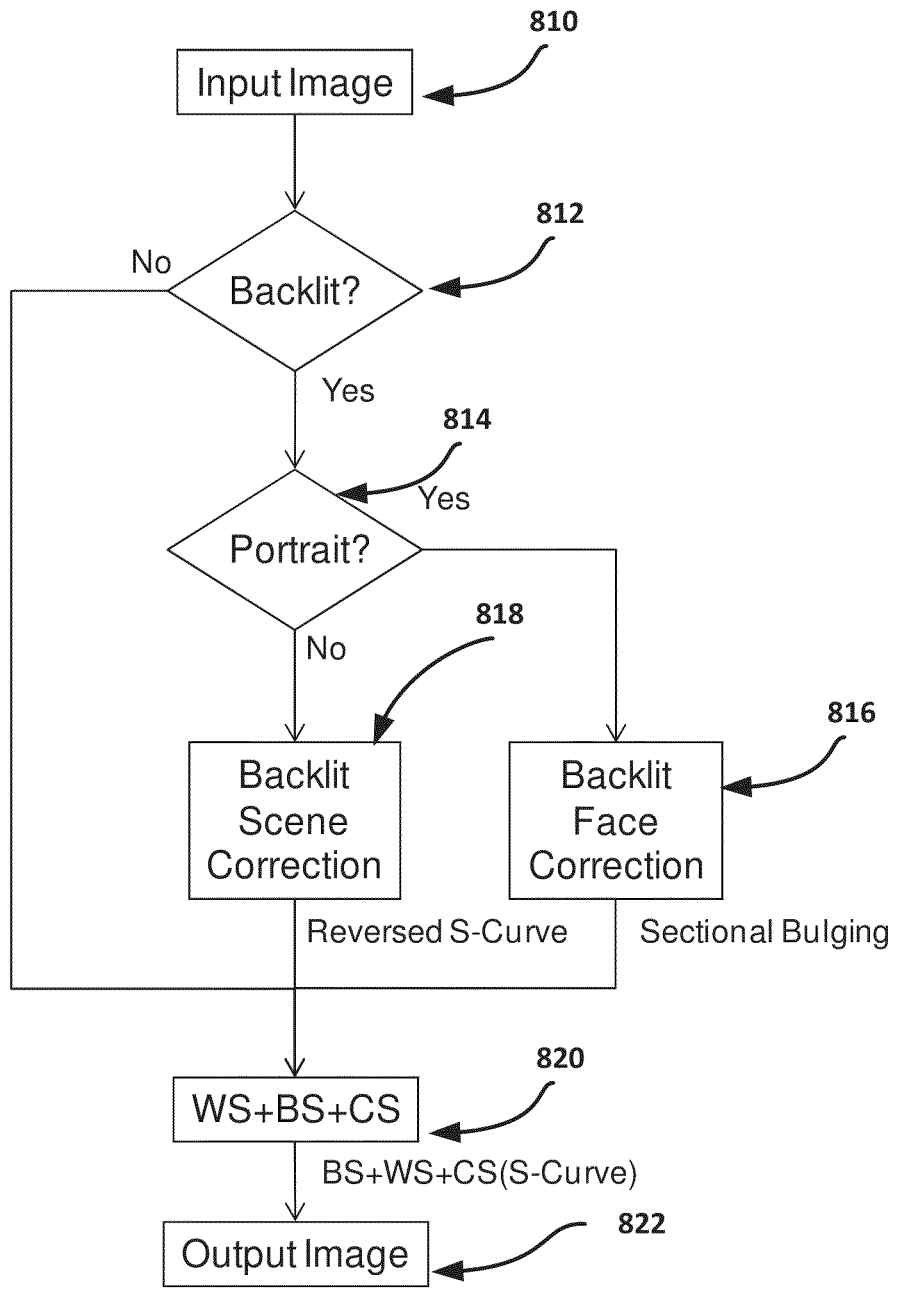
FIG. 8 is a flowchart of a method of image tone adjustment.

Referring now to FIG. 8 a flowchart of a method of image tone adjustment. The image tone adjustment system 700 accepts an input image. This image may be stored in data storage 708 or be received directly from an input, such as input 702. Upon receipt of the input image, the backlit detector 716 determines whether the image is backlit 812. This process may detect, for example, whether the primary subject of the application is darker than the surroundings. It may, alternatively, detect that the primary portions of a histogram of the image are weighted heavily at the light and dark ends with few code values in the middle of the histogram. A method of image backlit detection and correction is described in U.S. patent application Ser. No. 12/194,025 filed Aug. 19, 2008 entitled "System and Method for Backlit Image Adjustment."

If the image is backlit, then the image tone adjustment system tests to determine whether the input image is a portrait, i.e., an image with exactly one human face 814. This test may use face detection technology to detect if there is one frontal, upright big enough human face in an image and, thereby, determine that the image is a portrait.

If the image is a portrait, then backlit face correction is used 816. This type of correction utilizes sectional bulging to perform the backlit face correction 816. Sectional bulging will be described in more detail below. If the image is not a portrait, then reverse s-curve is used to perform the backlit scene correction. The process of applying a reverse s-curve will be described in more detail below.

If the image is not backlit, flow proceeds to BS+WS+CS (s-curve) processing 820. A BS+WS+CS (s-curve) is applied to the input image after it has been through the backlit processing to create the resulting output image 822. The process of applying each of the white stretch, black stretch and contrast stretch operations of the BS+WS+CS (s-curve) is described in more detail below. The resulting output image 822 has been automatically corrected for backlighting issues, brightness, darkness and contrast.

Figure 9:
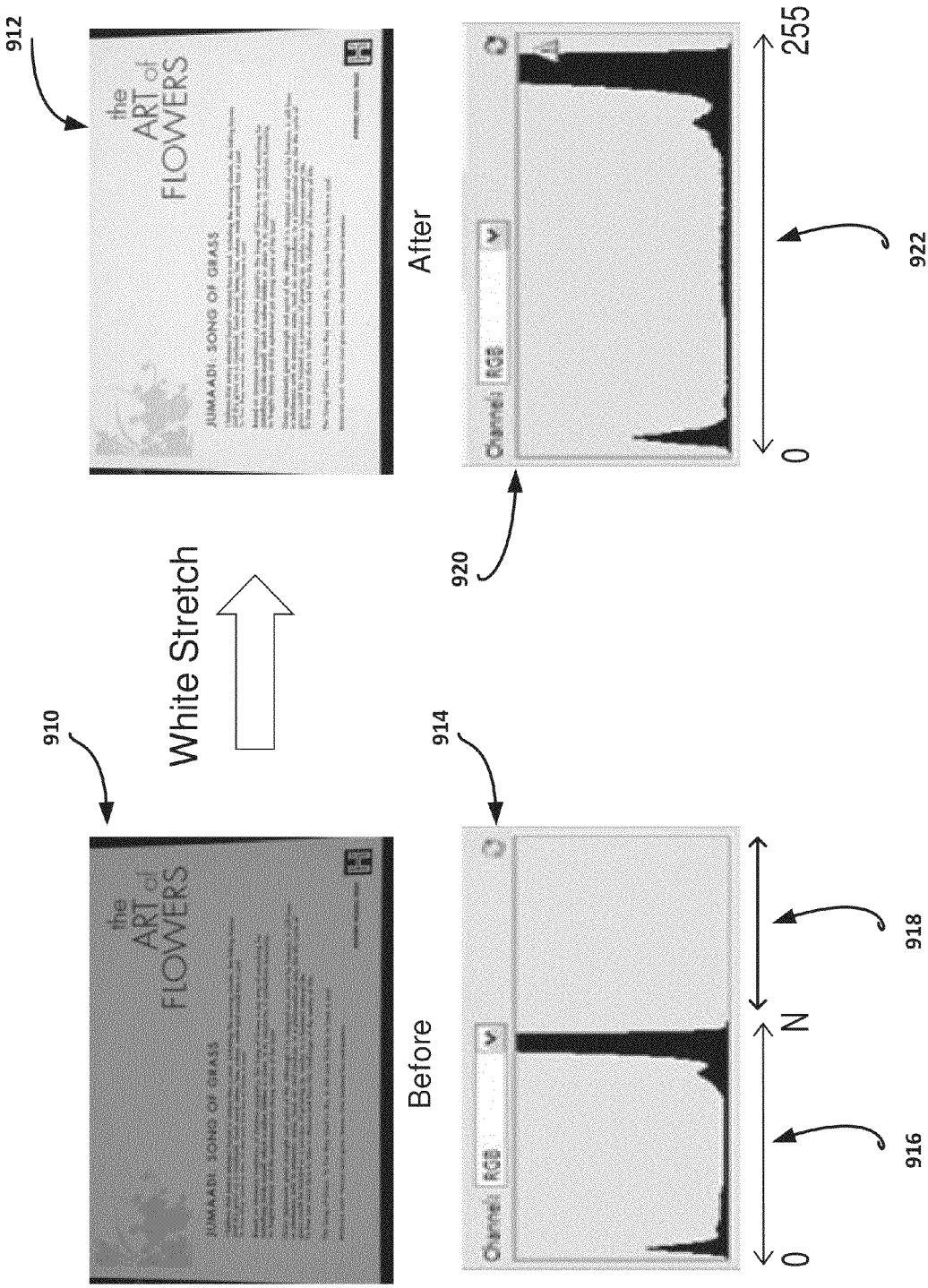
FIG. 9 is a depiction of a white stretch operation.

Turning now to FIG. 9, a white stretch operation is shown. In the white stretch operation, an image such as image 910 is transformed into an output image such as image 912. In order to perform this operation, the image tone adjustment system determines that the dynamic color range of the image 910 is utilizing less than the full 256 code values in the full range of one of the RGB values. In other embodiments, more than 256 code values may be available, but 256 is used throughout this application as an example of the RGB implementation in which 256 code values are available for each of the three RGB colors. Preferably, where operations are performed on the 256 code values for one of the RGB colors, the same operation is performed on all code values for the other two colors so as to maintain image color consistency.

This may be most easily seen by the human eye as a histogram that plots the number of occurrences of each image code value in an image. In FIG. 9, the histogram 914 shows that the dynamic range utilized by the image is only from 0 to N, where N is significantly less than the total available range of 256. The code value range used by image 910 is shown as range 916. The unused range is shown as range 918.

If the full dynamic range is not being used, the present application applies the white stretch to the range 916 and "stretches" the color range so as to utilize the full dynamic color range. The results can be seen in image 912 and the histogram 920 associated with the image. The range 922 is the full dynamic range of 0 to 255 of one of the three RGB colors.

Figure 10:
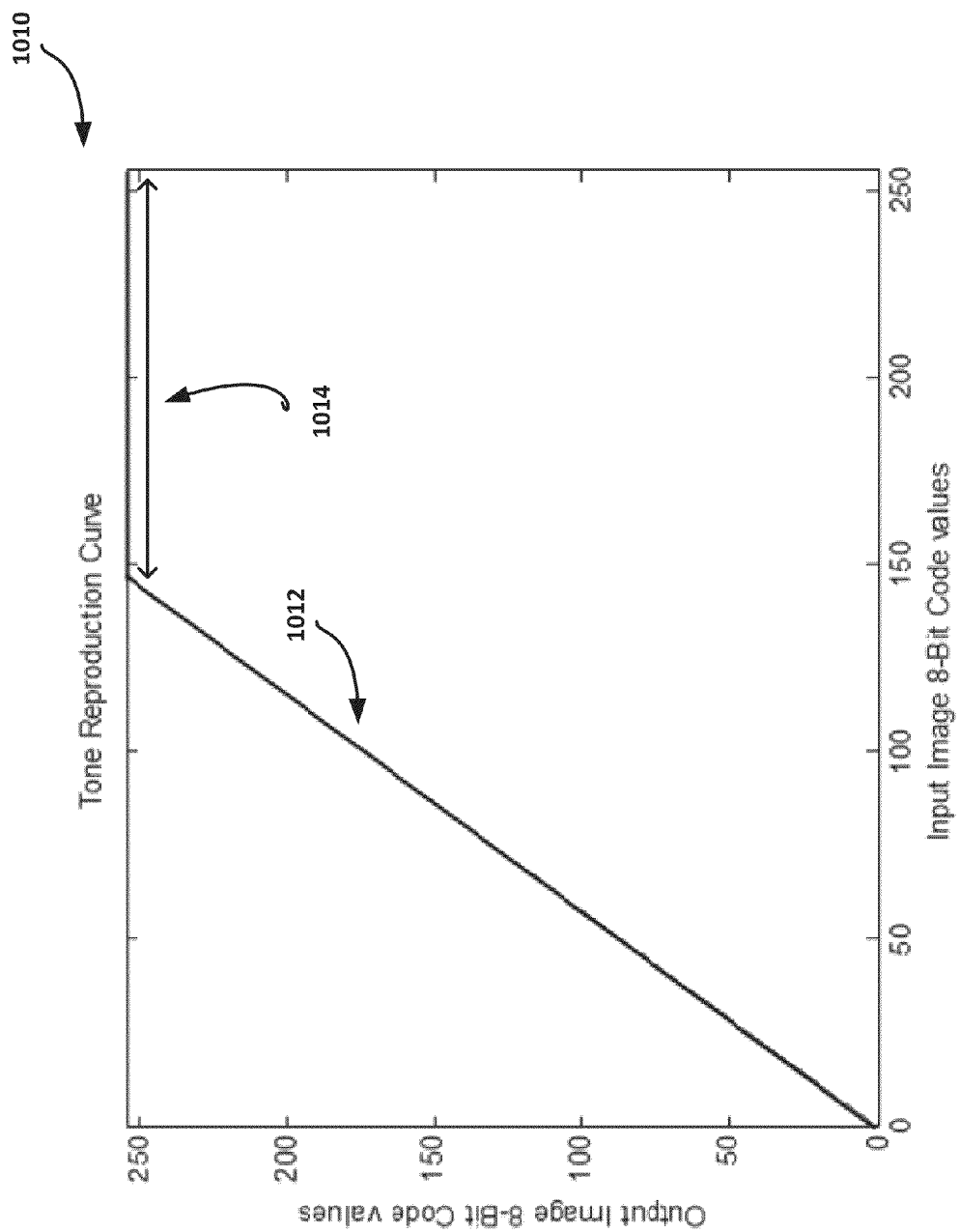
FIG. 10 is a tone reproduction curve suitable for a white stretch operation.
Figure 11:
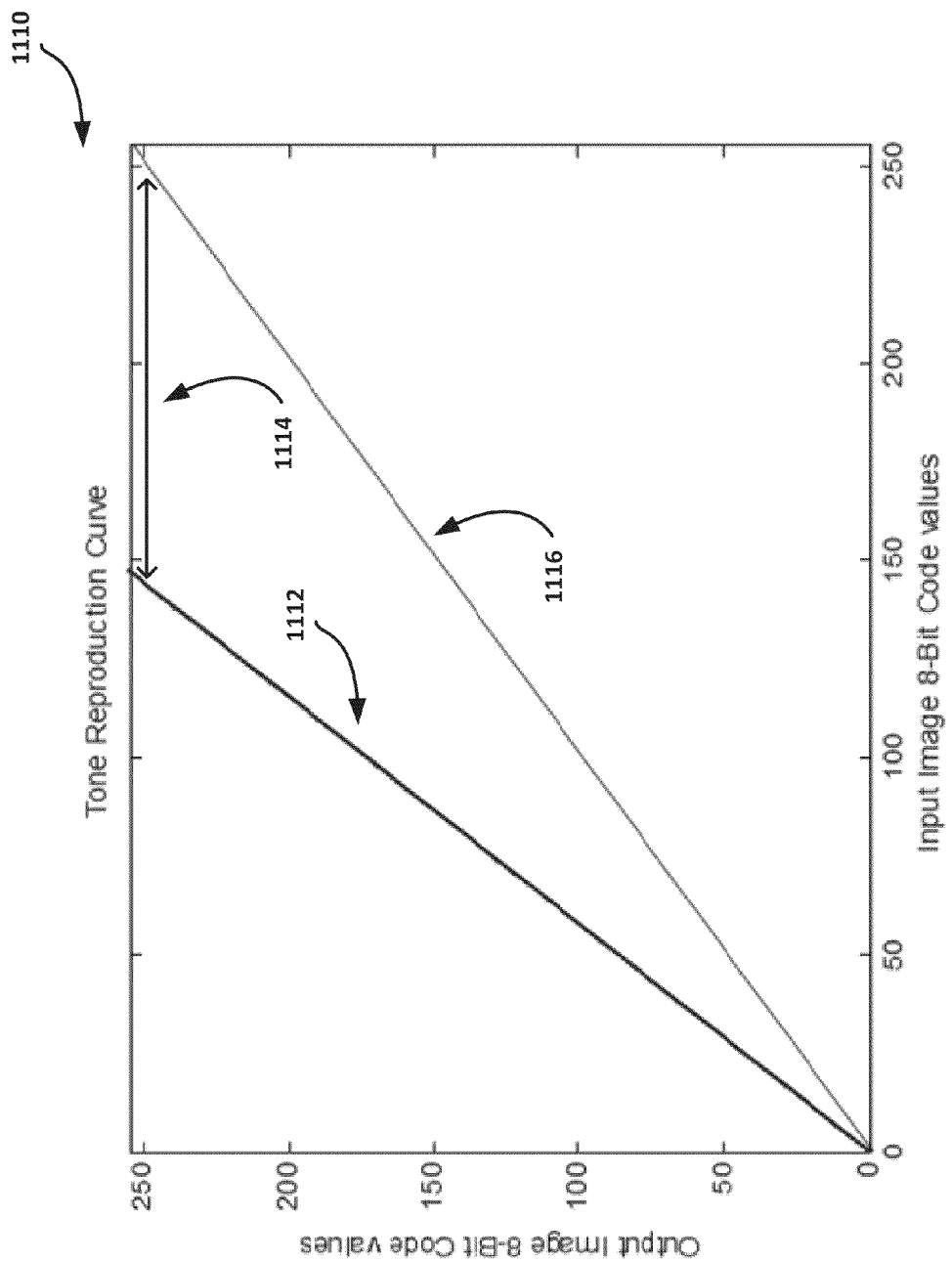
FIG. 11 is the tone reproduction curve of FIG. 10 after a white stretch operation.

Turning now to FIG. 10, a tone reproduction curve suitable for a white stretch operation is shown. In this figure, graph 1010 includes the tone reproduction curve 1012 which falls short of utilizing the entire 256 full dynamic color range. It falls short by range 1014. For comparison, the straight line 1116 is an identity tone reproduction curve where each output image code value is set equal to the corresponding input code value Turning now to FIG. 11, the tone reproduction curve of FIG. 10 after a white stretch operation is shown. The graph 1110 still includes the tone reproduction curve 1112 and the range 1114 of FIG. 10 (1012 and 1014, respectively). However, the graph 1110 now includes a white stretch tone reproduction curve 1116. As can be seen, this curve utilizes the full range of 256 code values.

Figure 12:
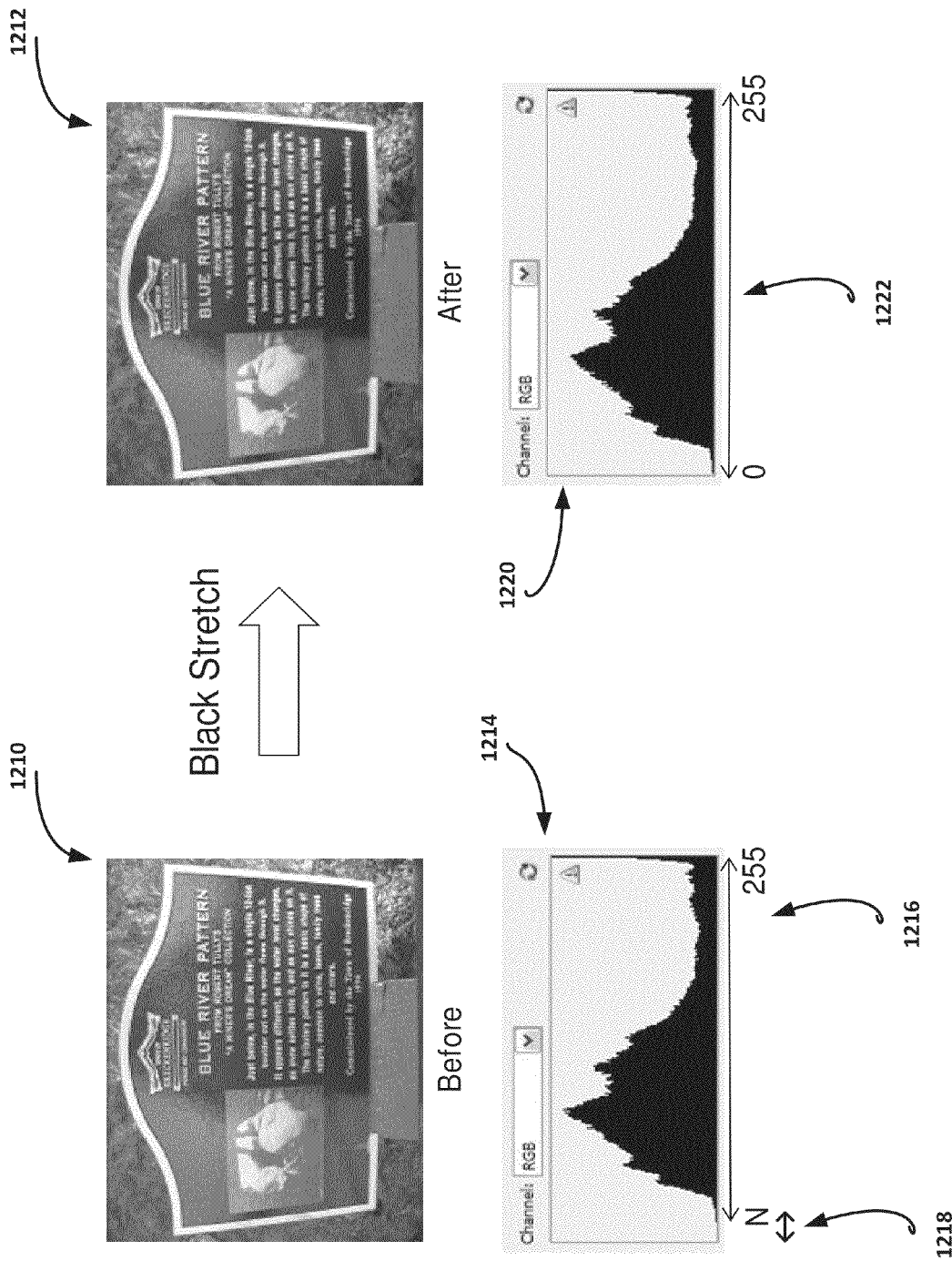
FIG. 12 shows is a black stretch operation.

Turning now to FIG. 12, a black stretch operation is shown. This operation begins with an image such as image 1210 and ends with an image such as image 1212. The black stretch operation may be most easily understood with reference to histogram 1214. Similarly to image 910, image 1210 is not utilizing the full range of 256 code values. In particular, the range 1216 from N to 255 is all that is being used. The range 1218 from 0 to N is not being used. Histogram 1220 is the histogram for image 1212 after the black stretch operation has been applied. Range 1222 is now the full range of code values from 0 to 255.

Figure 13:
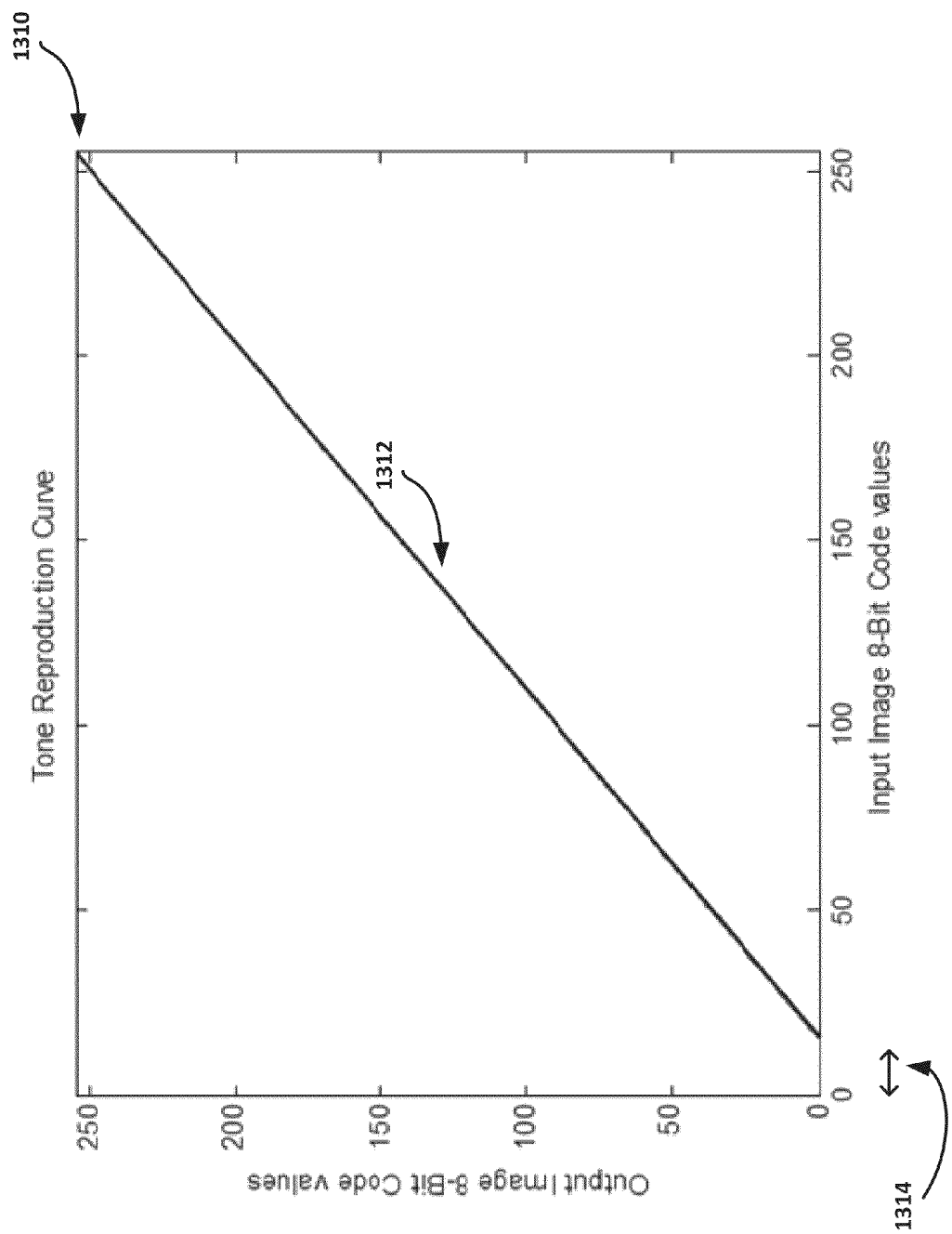
FIG. 13 is a tone reproduction curve suitable for a black stretch operation.

Turning now to FIG. 13, a tone reproduction curve suitable for a black stretch operation is shown. This graph 1310 shows a tone reproduction curve 1312 that is not utilizing the full range of code values available. In particular, the range 1314 is now being used by the image, such as image 1210.

Figure 14:
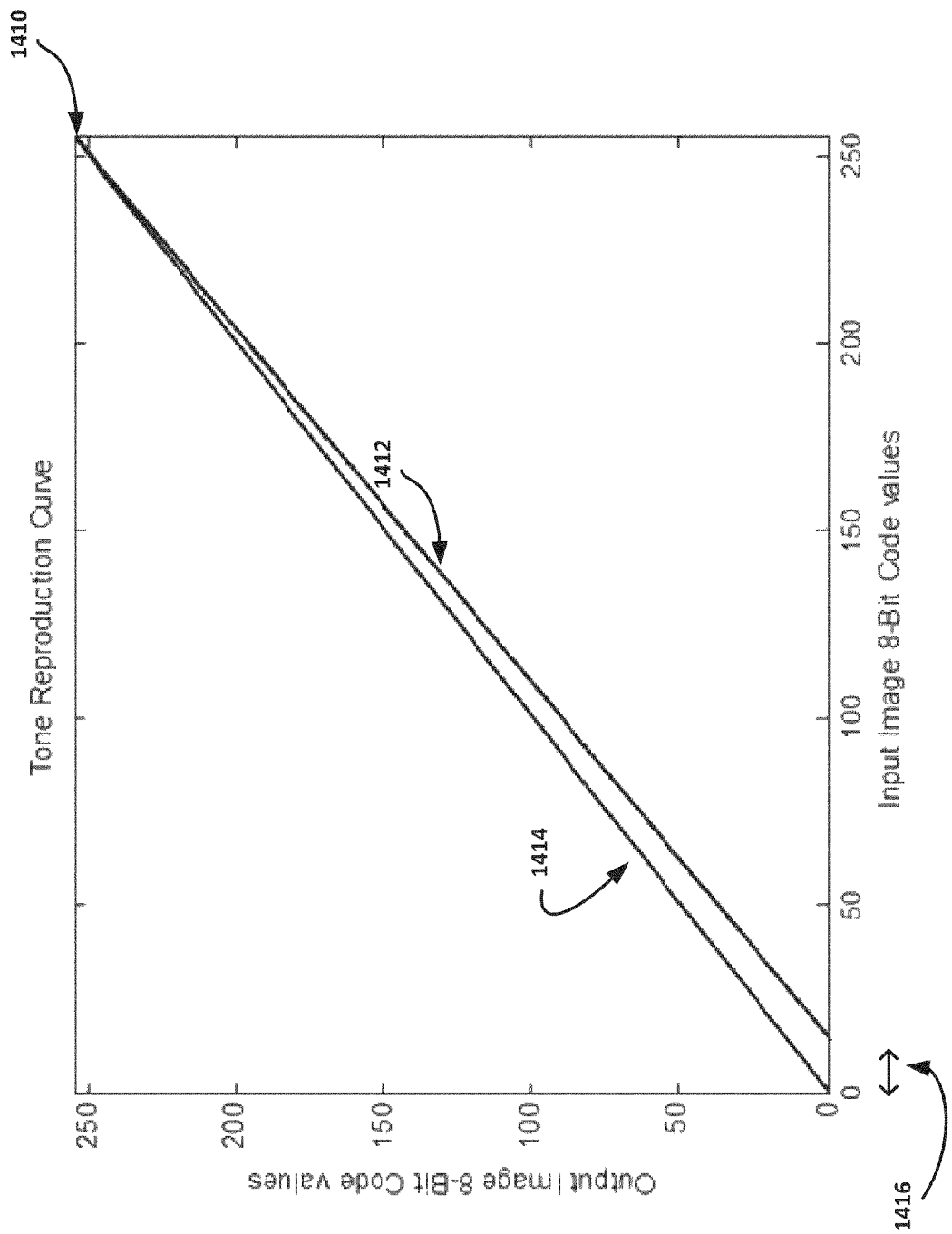
FIG. 14 is the tone reproduction curve of FIG. 13 after a black stretch operation.

Turning now to FIG. 14, the tone reproduction curve of FIG. 13 after a black stretch operation is shown. The graph 1410 depicts the tone reproduction curve 1412 (corresponding to 1312 in FIG. 13) and also shows the range 1416 of unused code value range. However, the tone reproduction curve 1414 is the same curve after the black stretch operation has been performed. As can be seen, it utilizes the full range of RGB code values from 0 to 255.

Figure 15:
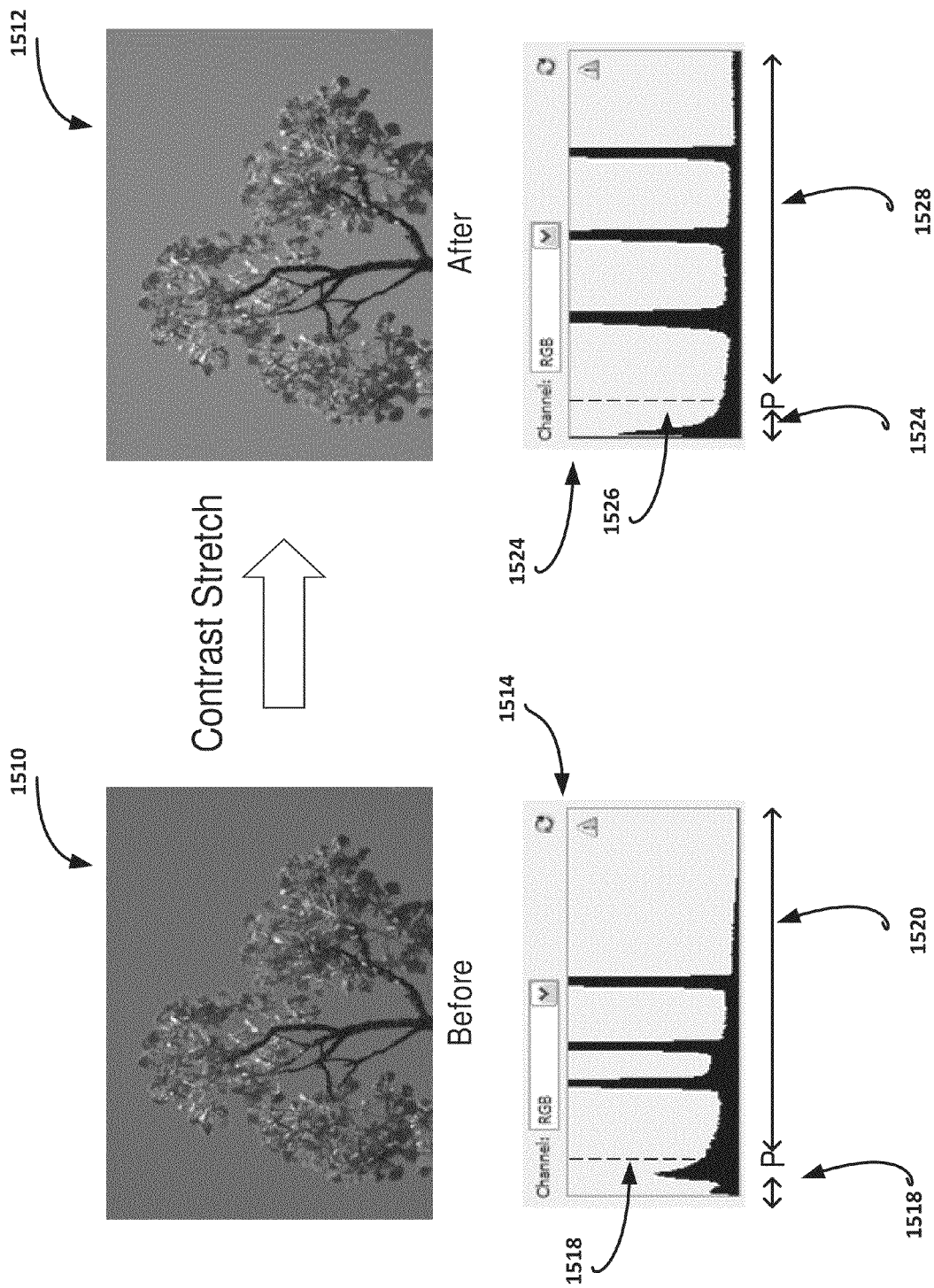
FIG. 15 shows contrast stretch operation.

Turning now to FIG. 15, a contrast stretch operation is shown. Image 1510 is an image before the contrast stretch operation and image 1512 is the image after the contrast stretch operation. The process may be most easily understood with reference to histogram 1514 and histogram 1522. In histogram 1514 the inflection point 1518 is selected so that the darkest portions fall to its left. This range 1516 will receive little stretching. The range 1520 to the right of the inflection point (P) 1518 will be stretched so as to better fill the entire range. In the resulting histogram 1522, the inflection point 1526 remains as the same point (as inflection point 1518) in the tone reproduction curve, but the range 1524 has been stretched so as to better fill out the entire range of code values. Similarly, range 1528 has been stretched so that its right tail is not so long. This enables the brighter colors to stand out more effectively from the darker colors.

Figure 16:
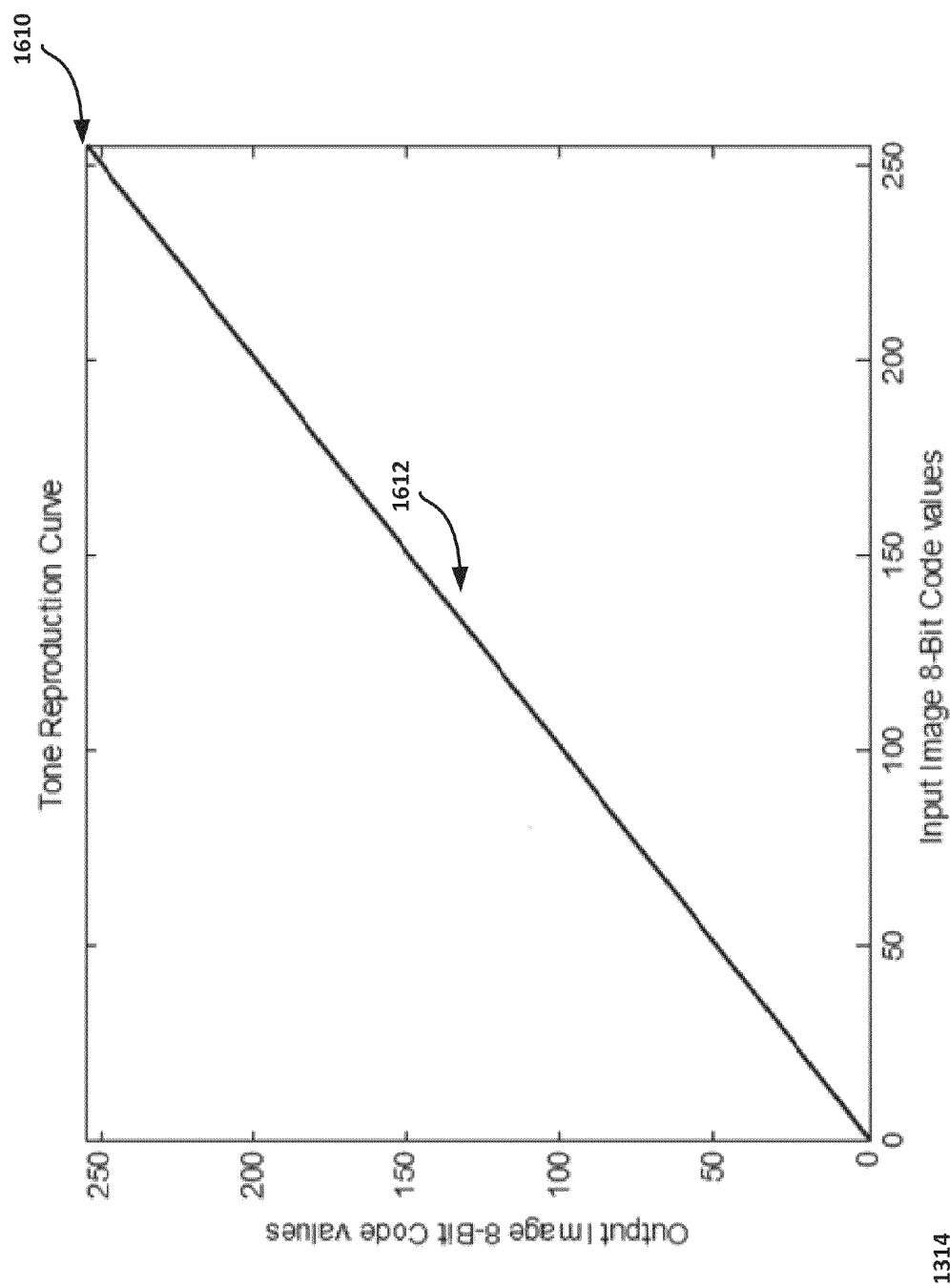
FIG. 16 is a tone reproduction curve suitable for a contrast stretch operation.
Figure 17:
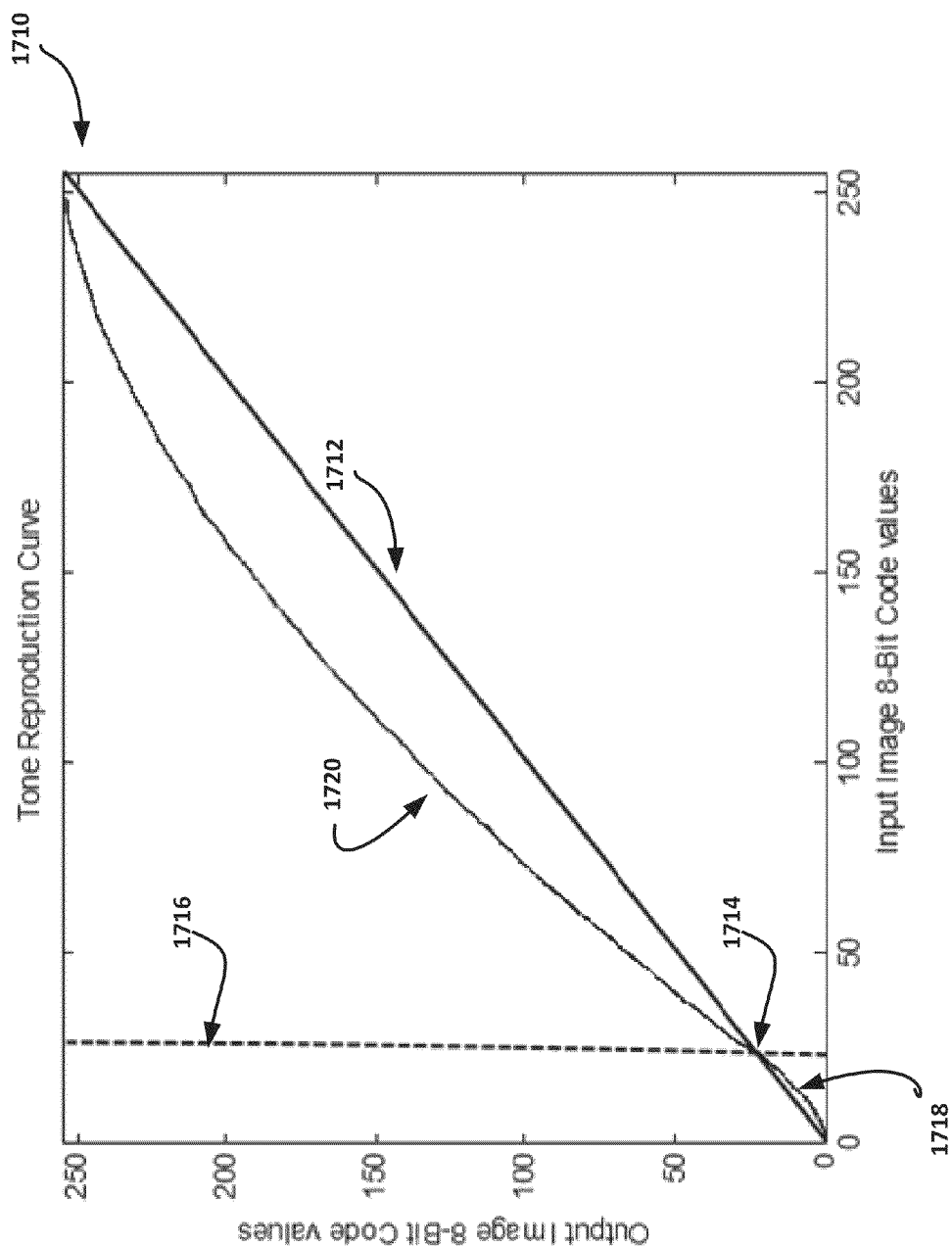
FIG. 17 is the tone reproduction curve of FIG. 16 after a contrast stretch operation.

Turning now to FIG. 16, a tone reproduction curve suitable for a contrast stretch operation is shown. The graph 1610 includes tone reproduction curve 1612 that is simply the identity of the entire code value range. However, FIG. 17 shows the tone reproduction curve 1712 of FIG. 16 (as tone reproduction curve 1612) after a contrast stretch operation. An inflection point 1714, also denoted by the line 1716 sets the point at which the s-curve of contrast stretch is applied to the tone reproduction curve 1712.

After application of the contrast stretch, the sagging portion 1718 falls below the original tone reproduction curve 1712 and the bulging portion 1720 rises substantially above the original tone reproduction curve 1712.

A method for generating the inflection point and curvature factors for the upper and lower portions of the s-shaped curve is described in co-pending U.S. patent application Ser. No. 12/940,934 filed Nov. 5, 2010 and entitled "Image Contrast Enhancement".

In order to generate the contrast stretch s-shaped curve, an evenly spaced array A1 is created from 0 to 1 with a step of, for example, 0.1. The sagging portion of the s-shaped curve S is generated first. The curvature factor for the sagging portion of the s-curve F1 is generated according to the method disclosed in the application identified above. The exponent for the sagging portion E1 is generated as $E1=0.01-0.20*F1+8*F2^2$. The sagging portion of the s-shaped curve S is then generated as $S=A1^{E1}$.

The bulging portion of the s-curve B is generated using an input curvature factor for the bulging portion F2 which is generated according to the application identified above. The exponent for the bulging portion E2 is generated as $E2=0.01-0.20*F2+8*F2^2$. A temporary variable TEMP is generated as $TEMP=A1^{E2}$. An array A2 of numbers from 100 down to 1 with a step of −1 is created. The bulging portion of the s-shaped curve B is then generated as $B=1+(1-TEMP(A2))$.

After the (x,y) coordinates of the inflection point are calculated as described above, the two halves of the s-shaped curve S and B are scaled according to the inflection point. The scaling factor for the x value XScale1 is generated as $XScale1=x/0.5$ and the scaling factor for the y value YScale1 is generated as $YScale1=y/0.5$. The scaled sagging portion SScale is then calculated as SScale=an interpolation of A1 and S*YScale/2 over the range 0 to 1 with a step of 0.01/XScale1. The scaled bulging portion BScale is calculated as BScale=an interpolation of A2 and B*(((1−y)/0.5)/2−(1−((1−y)/0.5−1)) over the range 1 to 100 with a step of x/0.5.

The two halves of the curve are then concatenated into the s-curve S-Curve and scaled into an array of 256 entries (in the RGB color scheme) using interpolation. The resulting 256-element array is the scaled S-Curve SS. Other array sizes may be used with other color schemes.

Next, the scaled S-Curve SS is further scaled horizontally according to the black stretch and white stretch. The BS and WS scaled S-Curve SSC is generated as SSC=an interpolation of A1 over SS with a step of 1.0/(2*(255−BS−WS)). The constants Low, High, ILow and IHigh are generated as Low=BS; High=255−WS, ILow=an array of 0s from 1-256 and IHigh=an array of 1s from 1-256. Finally, the three pieces are concatenated together as an array of three portions the array is filled with ILow (1 to Low) at the low end, with SSC (from Low+1 to High) and IHigh (from High+1 to 256) to thereby generate an adjusted tone reproduction curve.

In the event of a BS, WS or CS of zero, the unified formulation described above degenerates into a function lacking that variable. For example, if there is no black stretch for a given tone reproduction curve, the formulation above generates a value for BS that does not affect the resulting curve at all. Similarly, if there is no curvature factor input, that portion of the formulation does not affect the resulting tone reproduction curve. In this way, the formulation set forth above is a unified tone reproduction for black stretch, white stretch and contrast stretch.

Figure 18:
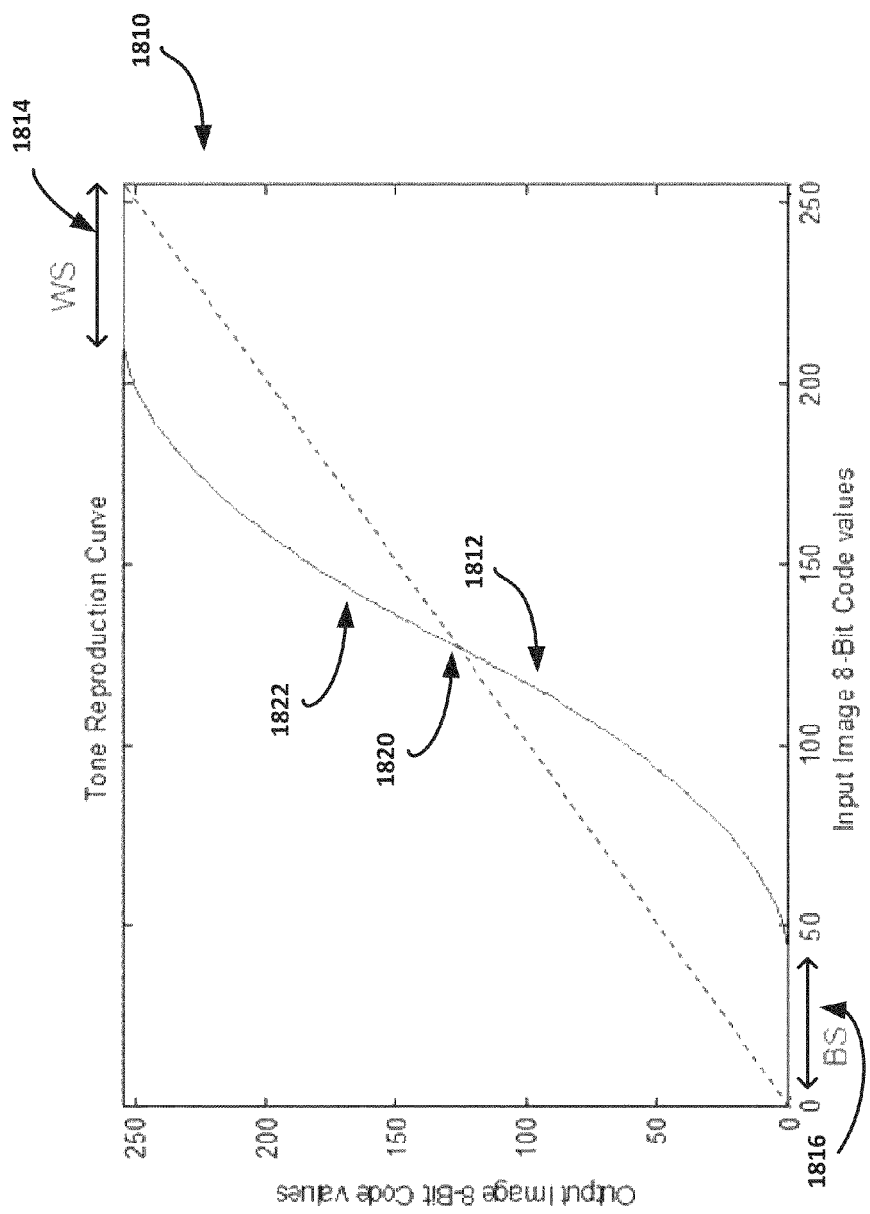
FIG. 18 is a tone reproduction curve suitable for a white stretch operation, a black stretch operation and a contrast stretch operation.

Turning now to FIG. 18, an exemplary tone reproduction curve to implement a white stretch operation, a black stretch operation and a contrast stretch operation is shown. In particular, graph 1810 shows a tone reproduction curve 1812 that includes a range 1814 suitable for a white stretch operation, a range 1816 suitable for a black stretch operation a sagging portion 1818 an inflection point 1820 and a bulging portion 1822. The contrast of the image may be further enhanced by performing each of the BS+WS+CS operations.

Figure 19:
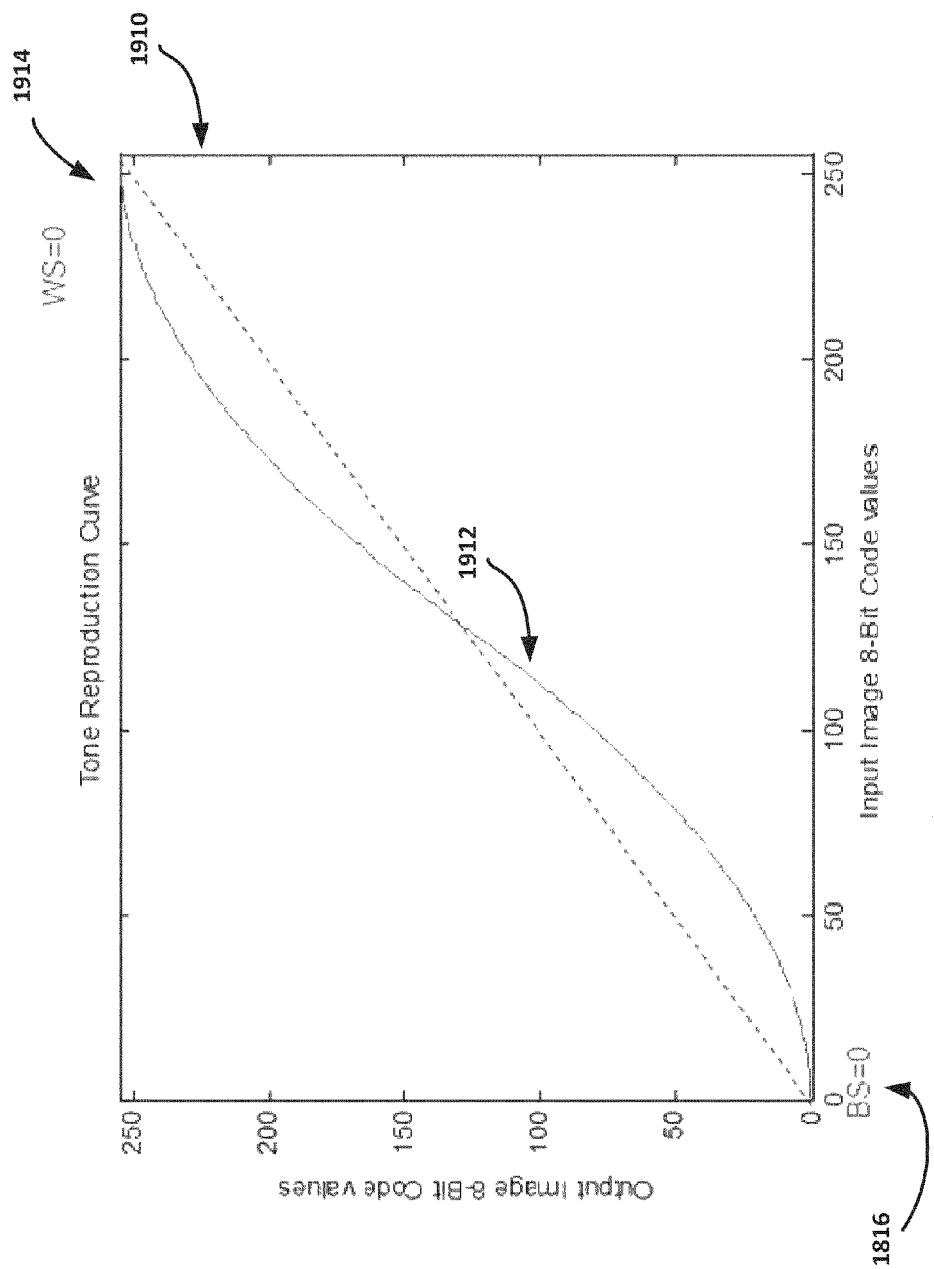
FIG. 19 is a tone reproduction curve with zero black stretch and white stretch and, thus, the tone reproduction curve degenerates to one suitable only for contrast stretch.

FIG. 19 shows a tone reproduction curve with zero black stretch and white stretch and, thus, the tone reproduction curve degenerates to one suitable only for contrast stretch is shown. In particular, the graph 1910 includes a tone reproduction curve 1912 that includes no range for white stretch 1914 or range for white stretch 1916 because both end-points of the tone reproduction curve touch the corners of the graph 1910. Accordingly, only a contrast stretch may be applied to this tone reproduction curve 1912. Applying the formula described above, the s-curve applied to the tone reproduction curve 1912 when WS equals 0 and BS equals 0 will degenerate to only a contrast stretch s-curve.

Figure 20:
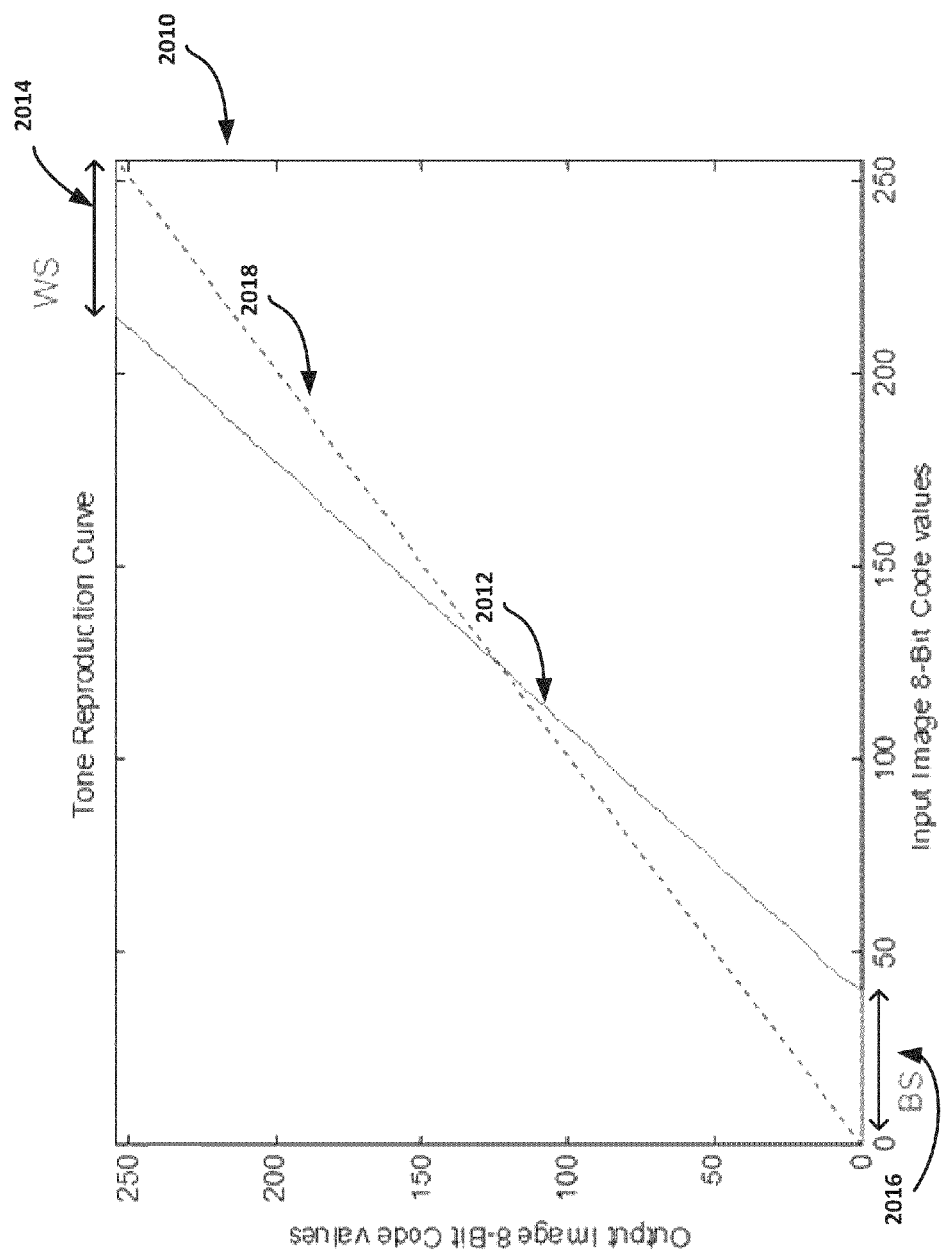
FIG. 20 is a tone reproduction curve with zero contrast stretch and, thus, the tone reproduction curve degenerates to one suitable only for black stretch and white stretch.

FIG. 20 shows a tone reproduction curve with zero contrast stretch and, thus, the tone reproduction curve degenerates to one suitable only for black stretch and white stretch. The graph 2010 includes a tone reproduction curve 2012 that is a straight line. No inflection point or curvature factor has been selected. However, the range 2014 and range 1016 are greater than zero, thus the white stretch and black stretch operations may be performed while ignoring the contrast stretch. In this way, the formula described above will degenerate into only a BS+WS formula, when no inflection point or curvature factor for the s-curve is given.

Figure 21:
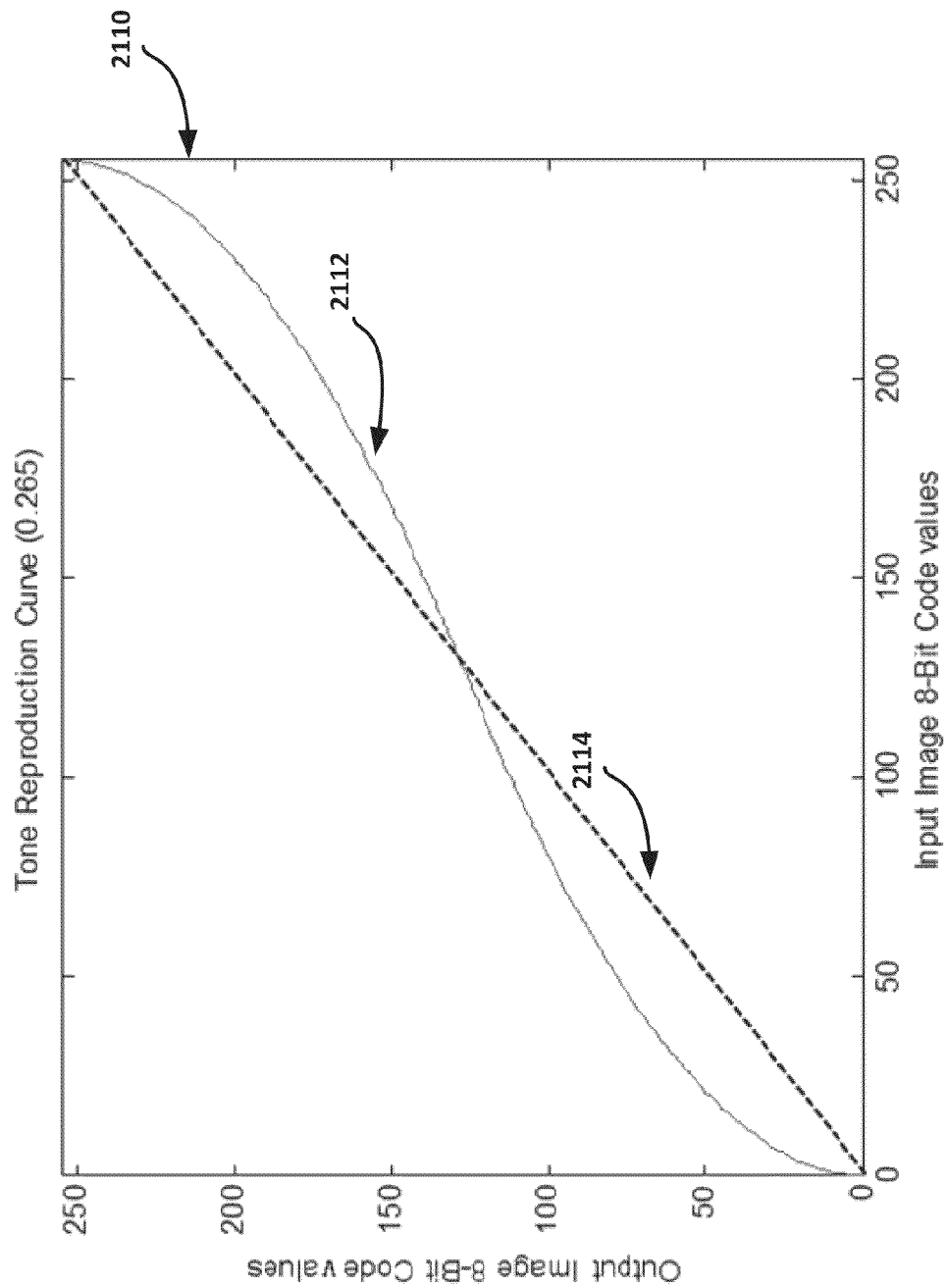
FIG. 21 is a tone reproduction curve of a reversed s-curve with a curvature factor of 0.265.

FIG. 21 is a tone reproduction curve of a reversed s-curve with a curvature factor of 0.265. A reversed s-curve is used in backlit correction. In images with backlighting issues, the primary problem is that there are very dark areas and very light areas, but no or very few in-between areas. Use of the reversed s-curve serves to increase the range over which the colors used in the image (darks and lights for non-portraits or darks only for portraits) may be seen. In increasing this range, the contrast between the portions become more readily distinguishable from one another and, thus, the image becomes clearer.

The graph 2110 includes the tone reproduction curve 2112 of a reversed s-curve with curvature factor 0.265. A curvature factor of approximately 0.365 is very nearly the identity as described in co-pending application Ser. No. 12/940,934 referenced above. This curvature factor is snapped to the identity in the present application because it is so close. As the curvature factor is decreased, the curvature of the reversed s-curve increases. The reversed s-curve can be applied to a non-portrait image to provide backlit correction.

Figure 22:
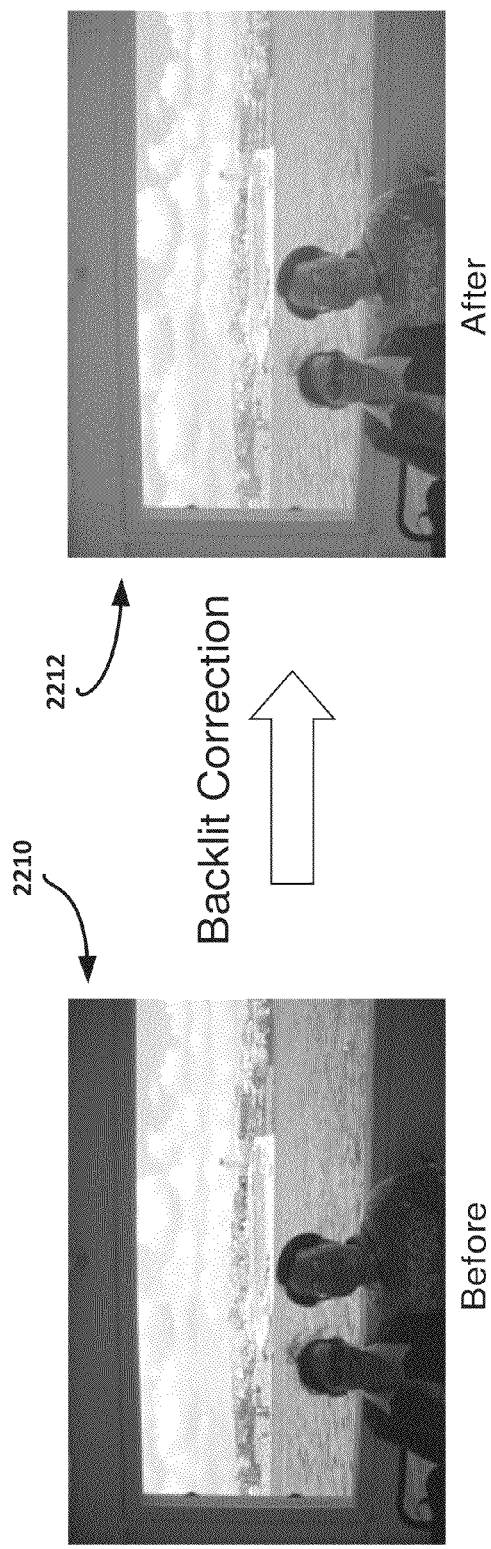
FIG. 22 is an example of an image before and after backlit correction.

Turning now to FIG. 22, an example of an image before and after backlit correction. Image 2210 is an image in which it is difficult to see the individuals' faces and the detail of the surroundings. Image 2212 is the image after the application of backlit correction. The image is of a much higher quality. The individuals' faces and detail of the surroundings are visible after the application of backlit correction. Because this is a non-portrait, the reversed s-curve, such as shown in FIG. 21 is used.

Figure 23:
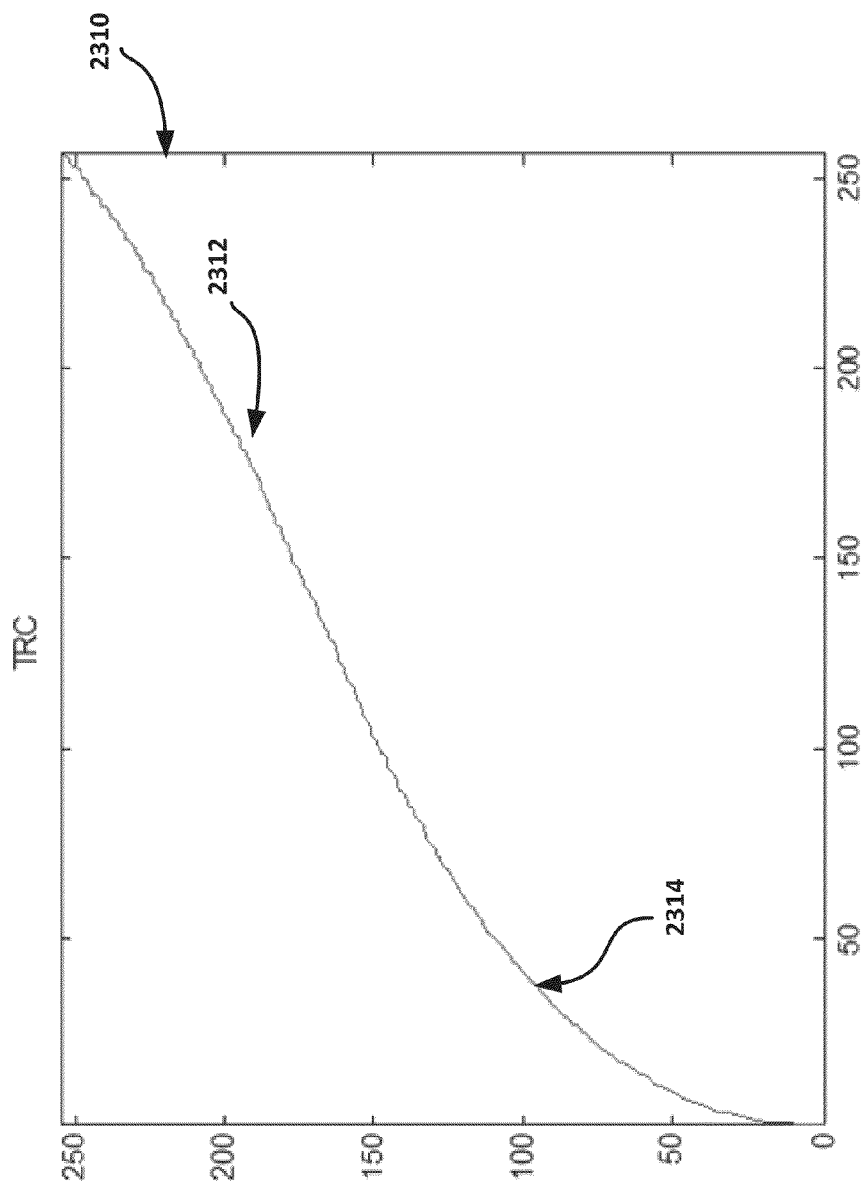
FIG. 23 is a tone reproduction curve using a reversed s-curve suitable for correcting the image in FIG. 23.

FIG. 23 is a tone reproduction curve using a reversed s-curve suitable for correcting the backlit image in FIG. 22. The graph 2310 includes an upper sagging portion 2312 and a lower bulging portion 2314. This is the inverse of the typical s-curve used for contrast enhancement. The inverse of the typical s-curve generally lightens dark colors and darkens bright colors.

The inflection point is selected so as to increase the color range used at the lower ranges and make the image higher contrast in the darker ranges where needed. The inflection point and curvature factor for reversed s-curves are determined in a manner identical to that used with a typical s-curve used for contrast enhancement, however, with the understanding that it will be applied to a reversed s-curve.

Figure 24:
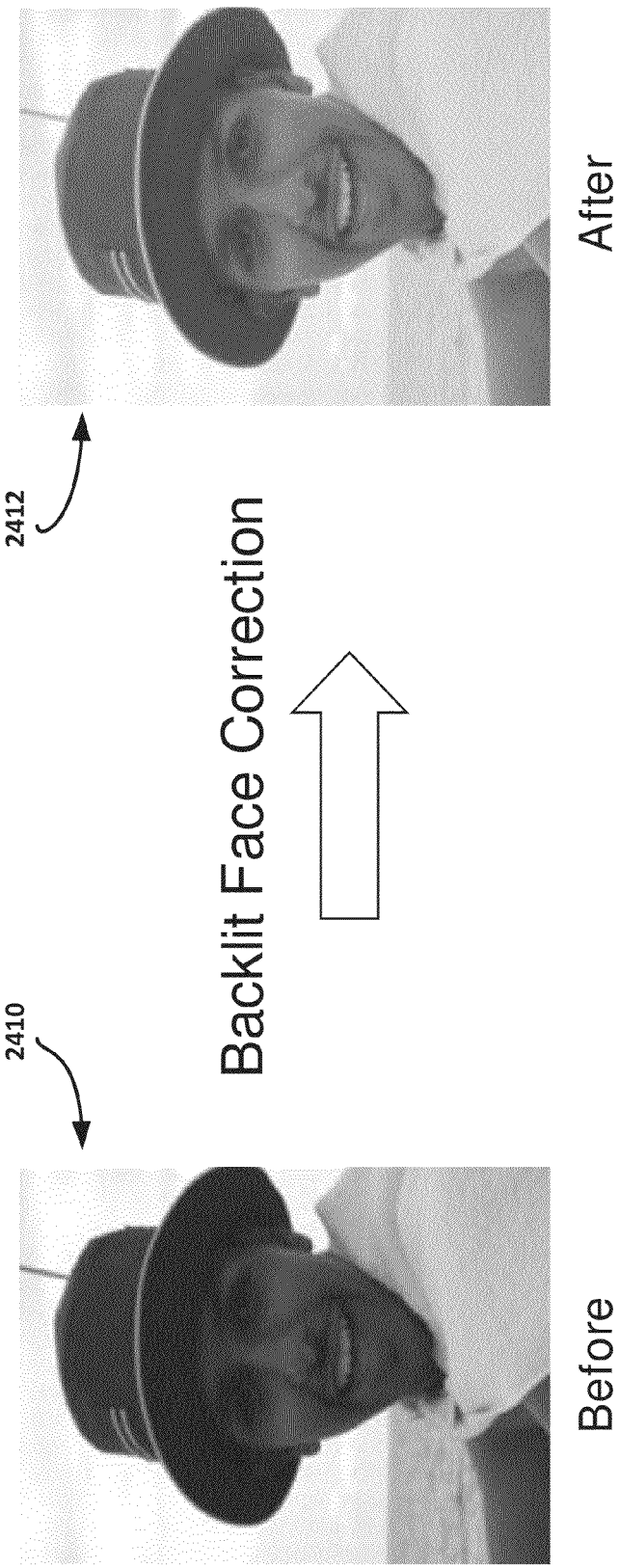
FIG. 24 is an example of an image before and after backlit face correction.

Turning now to FIG. 24, an example of an image before and after backlit face correction is shown. Image 2410 is an image in which the facial features of the portrait are difficult to discern. Image 2412 is an image after the application of backlit face correction is applied.

Figure 25:
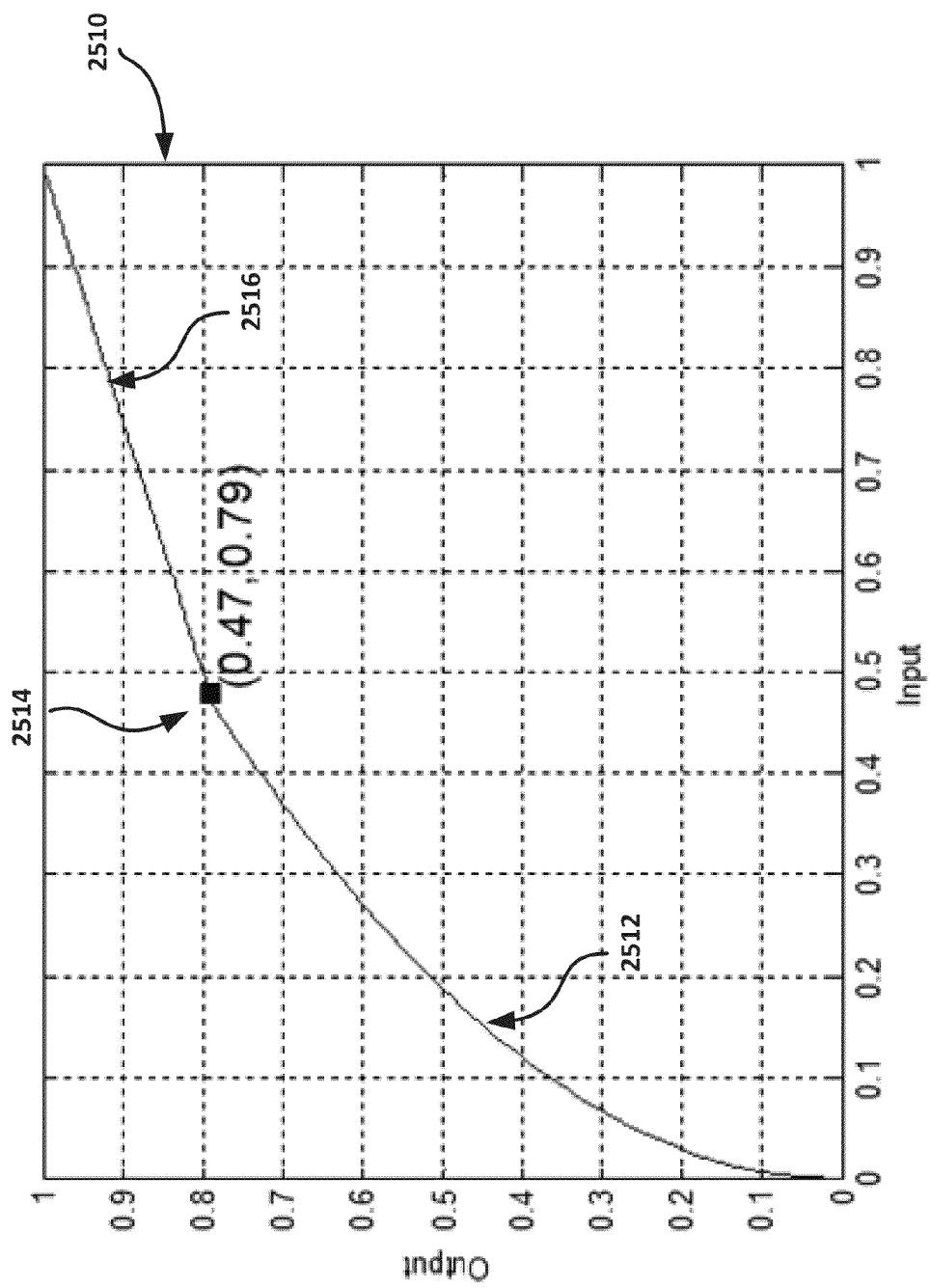
FIG. 25 is a tone reproduction curve using sectional bulging to perform backlit face correction.

FIG. 25 is a tone reproduction curve using sectional bulging to perform backlit face correction. This graph 2510 includes a tone reproduction line made up of three parts. The first is a curved upward-bulging portion of a reverse s-curve 2512. This portion of the curve is calculated in the same way as that described above with regard to FIGS. 23 and 24. The inflection point 2514 is also calculated in the same way.

The upper range of the code values is drawn simply as a straight line 2516. This serves to essentially stretch the remainder of the code values for the lighter colors over the remainder of the available code value range. This allows the contrast of that portion of the code values range to be, essentially, maintained while still providing greater range of contrast for the faces in the portraits.

Figure 26:
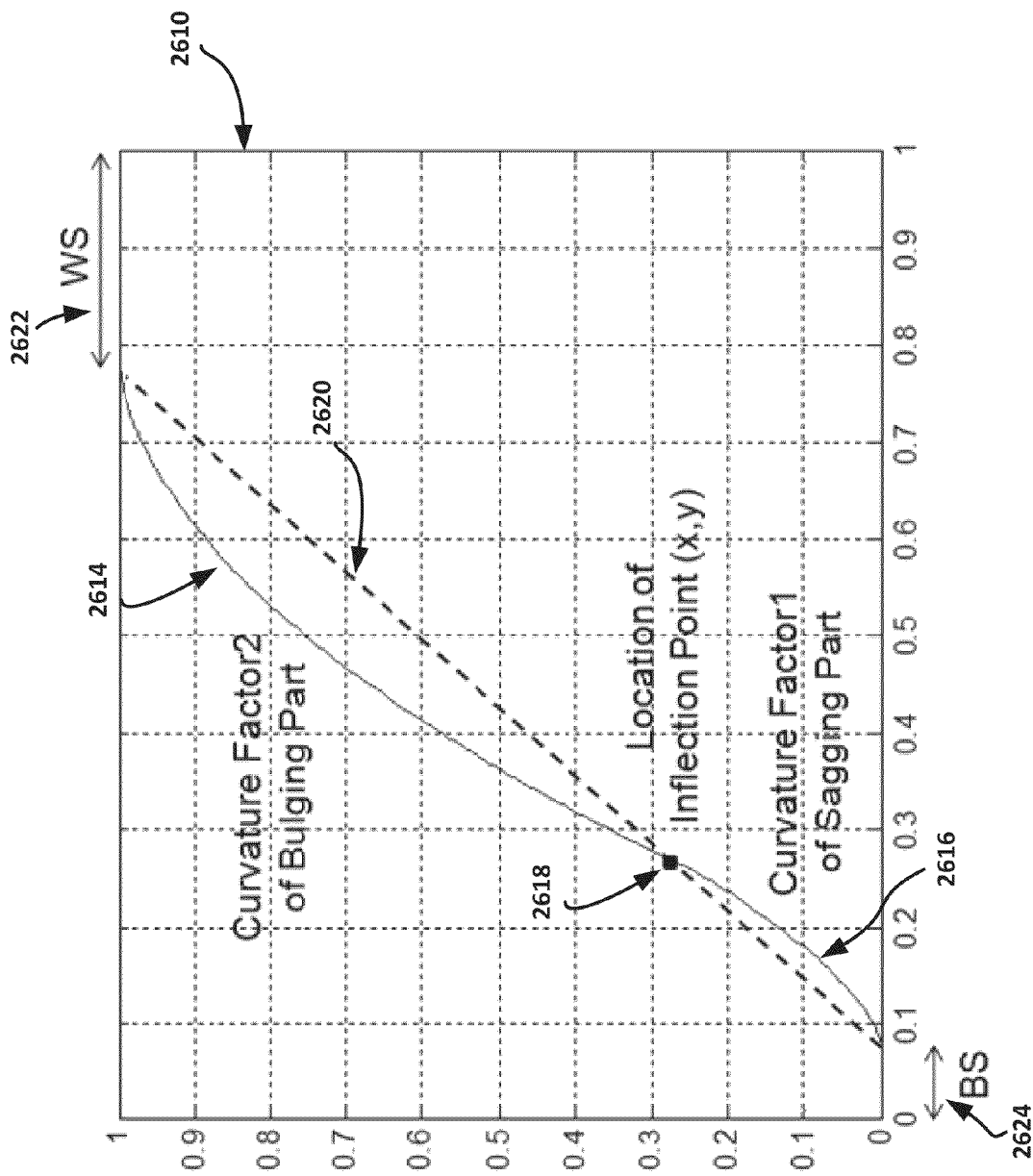
FIG. 26 is the generalized form of a tone reproduction curve using the unified formulation for image tone adjustment.

Turning now to FIG. 26, the generalized form of a tone reproduction curve using the unified formulation for image tone adjustment is shown. The graph 2610 includes an s-curve 2612 with an upper bulging part 2614, a lower sagging part 2616, and an inflection point 2618. The upper bulging part 2614 has one curvature factor and the lower sagging part 2616 has another curvature factor. The s-curve 2612 is also failing to utilize all of the available code value range, both in blacks and whites. Accordingly, there is a range 2622 available for white stretch and another range 2624 available for black stretch.

Figure 27:
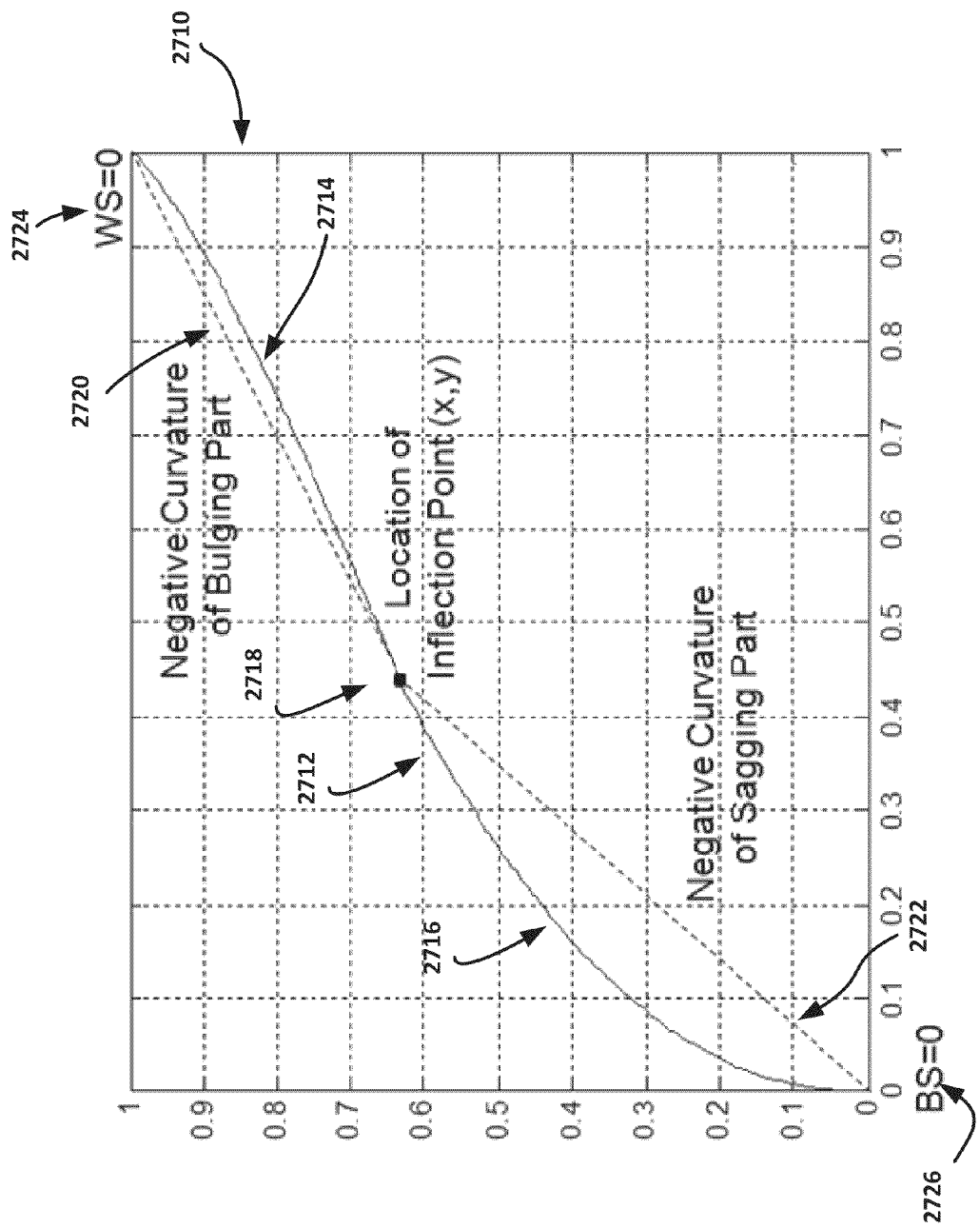
FIG. 27 is an example tone reproduction curve using a reverse s-curve and demonstrating the unified formulation for image tone adjustment.

Turning now to FIG. 27, an example tone reproduction curve using a reversed s-curve and demonstrating the unified formulation for image tone adjustment is shown. The graph 2710 includes an s-curve 2712 with an upper sagging portion 2714, a lower bulging portion 2716, and an inflection point 2718. The lines 2720 and 2722 show the extent of the curvature factor for each of the upper sagging portion 2714 and lower bulging portion 2716. In this graph 2710, there is no range 2724 for white stretch or range 2726 for black stretch. Though, in other forms of the reversed s-curve both may be found. This type of curve is used for non-portrait backlit correction.

Figure 28:
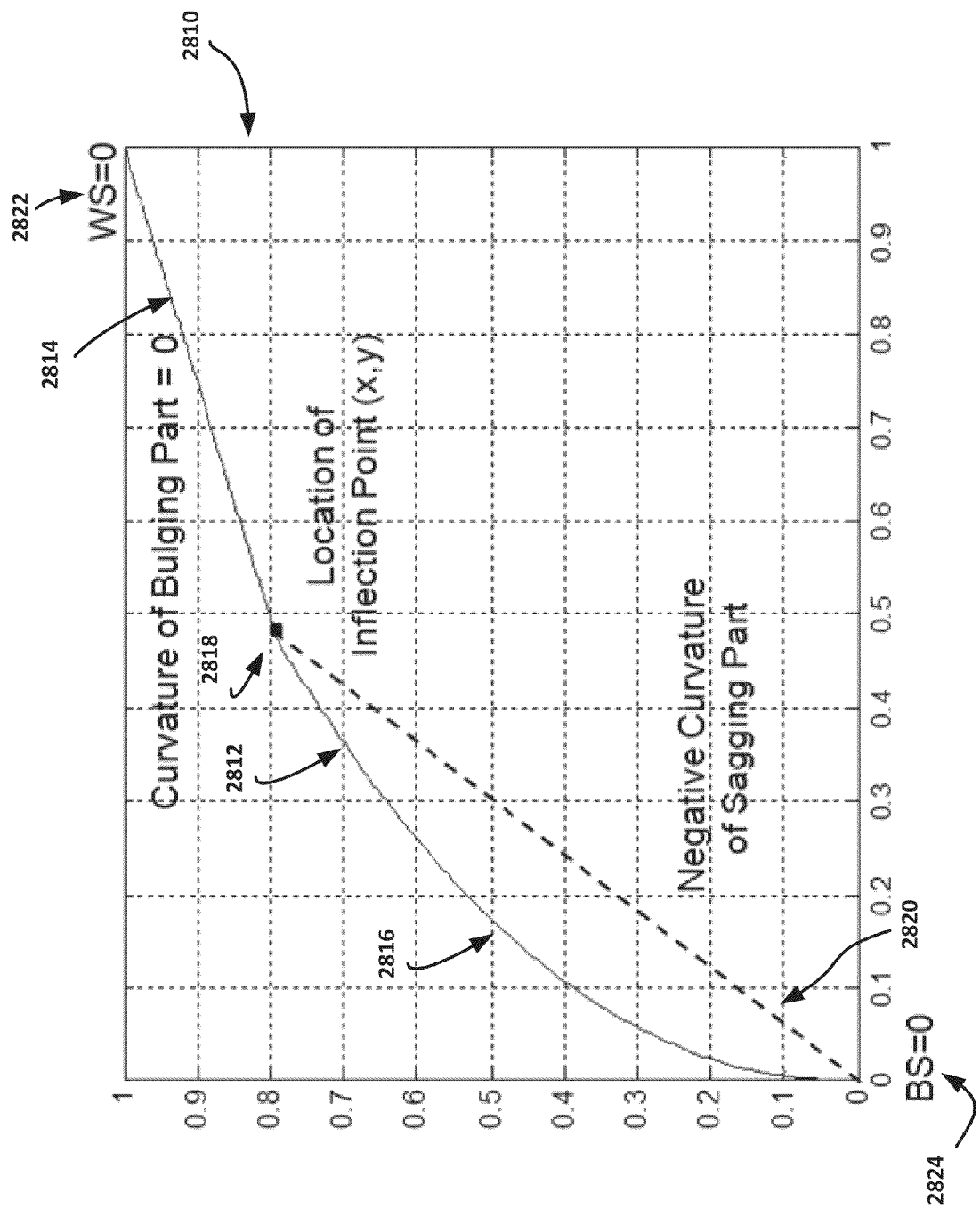
FIG. 28 is an example tone reproduction curve using a sectional bulging reversed s-curve in terms of the unified formulation for image tone adjustment.

Turning now to FIG. 28, an example tone reproduction curve using a sectional bulging reversed s-curve in terms of the unified formulation for image tone adjustment is shown. This graph 2810 includes a reversed s-curve 2812 with an upper straight line 2814, a lower bulging portion 2816, and an inflection point 2818. The straight line 2820 shows the extent of the curvature factor for the lower bulging portion. Again, there is no range 2822 for white stretch and no range 2824 for black stretch. Though, this tone reproduction curve may be used in other forms including ranges for both white and black stretch. This type of curve is used for portrait backlit correction.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A system for digital image tone adjustment comprising including a processor and associated memory, comprising:
   an input to accept an input image;
   a backlit detector for detecting images suitable for backlit correction;
   a curve generator to generate a tone reproduction curve including a backlit correction and a contrast stretch of the tone reproduction curve in the form of an s-shaped curve;
   a tone adjustment corrector to generate a white stretch of the tone reproduction curve, to generate a black stretch of the tone reproduction curve, and to apply the tone reproduction curve to the input image to generate a tone adjusted image such that:
      if the input image is backlit and not a portrait, applying backlit scene correction using a reversed s-curve; and
      if the input image is a backlit portrait, applying backlit face correction using sectional bulging; and
   an output to output the tone adjusted image to an associated image rendering device.

2. The system of claim 1 wherein the reversed s-curve includes a bulging lower portion where relative brightness is increased, a sagging upper portion where relative darkness is decreased, and an inflection point as a demarcation between the bulging lower portion and the sagging upper portion.

3. The system of claim 1 wherein the sectional bulging takes the form of a bulging lower portion where relative brightness is increased, a straight upper portion, and an inflection point as the demarcation between the bulging lower portion and the straight upper portion.

4. The system of claim 1 wherein the white stretch includes mapping each of the pixel values from a white stretch point at which the whitest pixel color value of the input image appears to a white color value.

5. The system of claim 1 wherein the black stretch includes mapping of each of the pixel values from a black stretch point at which the darkest pixel color value of the input image appears to a black color value.

6. The system of claim 1 wherein the contrast stretch includes mapping each of the pixel values along the tone reproduction curve to an s-curve including a bulging upper portion where relative brightness is increased, a sagging lower portion where relative darkness is decreased, and an inflection point as a demarcation between the bulging upper portion and the sagging lower portion.

7. A method of digital image tone adjustment comprising:
   detecting that an input image is suitable for backlit correction;
   generating a tone reproduction curve including a backlit correction and a contrast stretch of the tone reproduction curve in the form of an s-shaped curve;
   generating a white stretch of the tone reproduction curve;
   generating a black stretch of the tone reproduction curve;
   applying the tone reproduction curve to the input image to generate a tone adjusted image such that:
      if the input image is backlit and not a portrait, applying backlit scene correction using a reversed s-curve; and
      if the input image is a backlit portrait, applying backlit face correction using sectional bulging; and
   outputting the tone adjusted image to an associated image rendering device.

8. The method of claim 7 wherein the reversed s-curve includes a bulging lower portion where relative brightness is increased, a sagging upper portion where relative darkness is decreased, and an inflection point as a demarcation between the bulging lower portion and the sagging upper portion.

9. The method of claim 7 wherein the sectional bulging takes the form of a bulging lower portion where relative brightness is increased, a straight upper portion, and an inflection point as the demarcation between the bulging lower portion and the straight upper portion.

10. The method of claim 7 wherein the white stretch includes mapping each of the pixel values from a white stretch point at which the whitest pixel color value of the input image appears to a white color value.

11. The method of claim 7 wherein the black stretch includes mapping of each of the pixel values from a black stretch point at which the darkest pixel color value of the input image appears to a black color value.

12. The method of claim 7 wherein the contrast stretch includes mapping each of the pixel values along the tone reproduction curve to an s-curve including a bulging upper portion where relative brightness is increased, a sagging lower portion where relative darkness is decreased, and an inflection point as a demarcation between the bulging upper portion and the sagging lower portion.

13. Apparatus comprising a storage medium storing an image tone adjustment program having instructions which when executed by a processor will cause the processor to adjust the tone of images, the instructions of the image tone adjustment program for:
   detecting that an input image is suitable for backlit correction;
   generating a tone reproduction curve including a backlit correction and a contrast stretch of the tone reproduction curve in the form of an s-shaped curve;
   generating a white stretch of the tone reproduction curve;
   generating a black stretch of the tone reproduction curve;
   applying the tone reproduction curve to the input image to generate a tone adjusted image such that:
      if the input image is backlit and not a portrait, applying backlit scene correction using a reversed s-curve; and
      if the input image is a backlit portrait, applying backlit face correction using sectional bulging; and
   outputting the tone adjusted image to an associated image rendering device.

14. The apparatus of claim 13 wherein the reversed s-curve includes a bulging lower portion where relative brightness is increased, a sagging upper portion where relative darkness is decreased, and an inflection point as a demarcation between the bulging lower portion and the sagging upper portion.

15. The apparatus of claim 13 wherein the sectional bulging takes the form of a bulging lower portion where relative brightness is increased, a straight upper portion, and an inflection point as the demarcation between the bulging lower portion and the straight upper portion.

16. The method of claim 13 wherein the white stretch includes mapping each of the pixel values from a white stretch point at which the whitest pixel color value of the input image appears to a white color value and wherein the black stretch includes mapping of each of the pixel values from a black stretch point at which the darkest pixel color value of the input image appears to a black color value.

17. The method of claim 13 wherein the contrast stretch includes mapping each of the pixel values along the tone reproduction curve to an s-curve including a bulging upper portion where relative brightness is increased, a sagging lower portion where relative darkness is decreased, and an inflection point as a demarcation between the bulging upper portion and the sagging lower portion.

* * * * *